(12) United States Patent
Barker et al.

(10) Patent No.: US 10,970,651 B1
(45) Date of Patent: Apr. 6, 2021

(54) ANALYTIC SYSTEM FOR TWO-STAGE INTERACTIVE GRAPHICAL MODEL SELECTION

(71) Applicant: SAS Institute Inc., Cary, NC (US)

(72) Inventors: Clayton Adam Barker, Cary, NC (US); Ryan Jeremy Parker, Raleigh, NC (US); Christopher Michael Gotwalt, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/904,698

(22) Filed: Jun. 18, 2020

Related U.S. Application Data

(60) Provisional application No. 62/942,427, filed on Dec. 2, 2019.

(51) Int. Cl.
   *G06N 20/00* (2019.01)
(52) U.S. Cl.
   CPC ................... *G06N 20/00* (2019.01)
(58) Field of Classification Search
   CPC .. G06F 3/0482; G06F 3/04847; G06F 3/0484; G06N 20/00; G06N 7/005; G06N 3/08; H04L 67/02
   See application file for complete search history.

(56) References Cited

U.S. PATENT DOCUMENTS

| | | | |
|---|---|---|---|
| 6,882,958 B2 | 4/2005 | Schmidt et al. | |
| 7,194,394 B2 | 3/2007 | Dorfman et al. | |
| 8,078,427 B2 | 12/2011 | Tischler et al. | |
| 9,773,211 B2 | 9/2017 | Barker | |
| 2012/0284213 A1* | 11/2012 | Lin | G06N 3/08 706/12 |
| 2014/0379629 A1* | 12/2014 | Loew-Baselli | A61P 7/04 706/52 |
| 2016/0110657 A1* | 4/2016 | Gibiansky | G06N 20/00 706/12 |

(Continued)

OTHER PUBLICATIONS

Moran et al., "New models for old questions: generalized linear models for cost prediction," 2007, Journal of Evaluation in Clinical Practice, pp. 1-9 (Year: 2007).*

(Continued)

*Primary Examiner* — Miranda M Huang
*Assistant Examiner* — Catherine F Lee
(74) *Attorney, Agent, or Firm* — Bell & Manning, LLC

(57) ABSTRACT

Graphical interactive model selection is provided. A dataset includes observation vectors defined for each value of a plurality of values of a group variable. A nonlinear model is trained with each plurality of observation vectors to describe the response variable based on the explanatory variable for each value of the plurality of values of the group variable. Nonlinear model results are presented within a first sub-window of a first window. An indicator of a request to perform parameter analysis of the nonlinear model results is received. A linear model is trained. Trained linear model results from the trained linear model are presented within a second sub-window of the first window for each parameter variable of the nonlinear model. Predicted response variable values are presented as a function of the explanatory variable and the factor variable value using the trained nonlinear model within a third sub-window of the first window.

30 Claims, 22 Drawing Sheets

(56) References Cited

U.S. PATENT DOCUMENTS

| | | | |
|---|---|---|---|
| 2017/0178027 A1* | 6/2017 | Duggan | G06F 9/50 |
| 2017/0213131 A1* | 7/2017 | Hammond | G06N 3/008 |
| 2019/0179648 A1* | 6/2019 | Kevorkian | G06F 9/451 |

OTHER PUBLICATIONS

Aexd About Design of Experiments Software, Tutorial Aexd.net, printed Jan. 23, 2020; https://aexd.net/about-software/#aexd.

Madalina Dinita, Best curve fitting software for Windows 10 (2020 guide), Windows Report, printed from the internet Jan. 23, 2020.

Curve Fitting Software|NCSS Statistical Software|NCSS 2019 Data Analysis, printed from the internet Jan. 23, 2020, https://www.ncss.com/software/ncss/curve-fitting-in-ncss/.

Curve and Surface Fitting, OriginLab, printed from the internet Jan. 23, 2020, https://www.originlab.com/index.aspx?go=Products/Origin/DataAnalysis/CurveFitting.

DataFit Product Features, DataFit Curve Fitting and Data Plotting Software Features, Oakdale Engineering, printed from the internet Jan. 23, 2020, www.oakdaleengr.com/datafit.htm.

Ramsay et al., Functional Data Analysis, Package "fda", Jul. 5, 2018.

"Free Software for Curve fitting or best fit equation," questions, printed Jan. 23, 2020from https://www.researchgate.net/post/Free_Software_for_Curve_fitting_or_best-fit_equation.

JMP Design of Experiments Guide, Version 15 JMP, A business Unit of SAS, 2019.

JMP Fitting Linear Models, Version 15, JMP, A business unit of SAS, 2019.

JMP Multivariate Methods, Version 15, JMP, A business unit of SAS, 2019.

JMP Predictive and Specialized Modeling, JMP, A Business Unit of SAS, 2020, Version 15.1.

JMP Predictive and Specialized Modeling, JMP, a Business Unit of SAS, 2019.

JMP Profilers, JMP, A business Unit of SAS, Version 15.1, 2020.

LAB Fit Curve Fitting Software (Nonlinear Regression Program), printed Jan. 23, 2020, www.labfit.net.

Marie Davidian, "Nonlinear Mixed Effects Models, An Overview and Update," JABES 8, 387-419, 2003.

SigmaPlot—Curve Fitting and Regression | Systat Software, Inc., printed Jan. 23, 2020, https://systatsoftware.com/products/sigmaplot/sigmaplot-curve-fitting_and_regression/.

TableCurve 2D—Curve Fitting Made Fast and Easy, printed Jan. 23, 2020, www.sigmaplot.co.uk/produccts/tablecurve2d/tablecurve 2d/php.

Simfit, Simulation, fitting, statistics, and plotting. William G. Bardsley, Reference Manual Version 7.6.2, 2007.

* cited by examiner

ANALYTIC SYSTEM FOR TWO-STAGE INTERACTIVE GRAPHICAL MODEL SELECTION

CROSS-REFERENCE TO RELATED APPLICATIONS

The present application claims the benefit of 35 U.S.C. § 119(e) to U.S. Provisional Patent Application No. 62/942,427 filed on Dec. 2, 2019, the entire contents of which are hereby incorporated by reference.

BACKGROUND

A nonlinear model can be used to model a chemical reaction as a function of time. For example, in each cell of a 96 well plate, an amount of cortisol is added. 96 reactions result in 96 nonlinear regressions and 96 sets of parameter estimates defined by the nonlinear regression computations. If the goal is to understand how the amount of cortisol added impacts the trained nonlinear model, a model is built in in two stages. Stage 1: train the nonlinear models $y \sim f(x, \theta)$ to get parameter estimates $\hat{\theta}_j$ for each subject j. Stage 2: with the parameter estimates as responses, train a linear model $\theta \sim g(z,\beta)$ for each parameter of the nonlinear model to understand how a factor variable such as the amount of cortisol added effects the response. However, building this two-stage model is manual and tedious for a single iteration. When the user wants to explore the effects, the procedure may be started again from the beginning if adjustment of the nonlinear models is desired.

SUMMARY

In an example embodiment, a non-transitory computer-readable medium is provided having stored thereon computer-readable instructions that, when executed by a computing device, cause the computing device to provide interactive model selection. A dataset is read that includes a plurality of observation vectors defined for each value of a plurality of values of a group variable. Each observation vector of each plurality of observation vectors includes an explanatory variable value of an explanatory variable and a response variable value of a response variable. (A) A nonlinear model is trained with each plurality of observation vectors to describe the response variable based on the explanatory variable for each value of the plurality of values of the group variable. The trained nonlinear model defines a parameter estimate value for each parameter variable of the nonlinear model for each value of the plurality of values of the group variable. (B) Nonlinear model results are presented from the trained nonlinear model within a first sub-window of a first window of a display. (C) An indicator of a request to perform parameter analysis of the nonlinear model results is received using a predefined factor variable. The indicator is received in association with the first window of the display. Each observation vector of each plurality of observation vectors further includes a factor variable value of the predefined factor variable. (D) A linear model is trained for each parameter variable of the nonlinear model using the factor variable value associated with each observation vector of each plurality of observation vectors as a model effect. (E) Trained linear model results from the trained linear model are presented for each parameter variable of the nonlinear model within a second sub-window of the first window of the display. (F) Predicted response variable values are presented as a function of the explanatory variable and the factor variable value using the trained nonlinear model within a third sub-window of the first window of the display.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide interactive model selection.

In yet another example embodiment, a method of interactive model selection is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
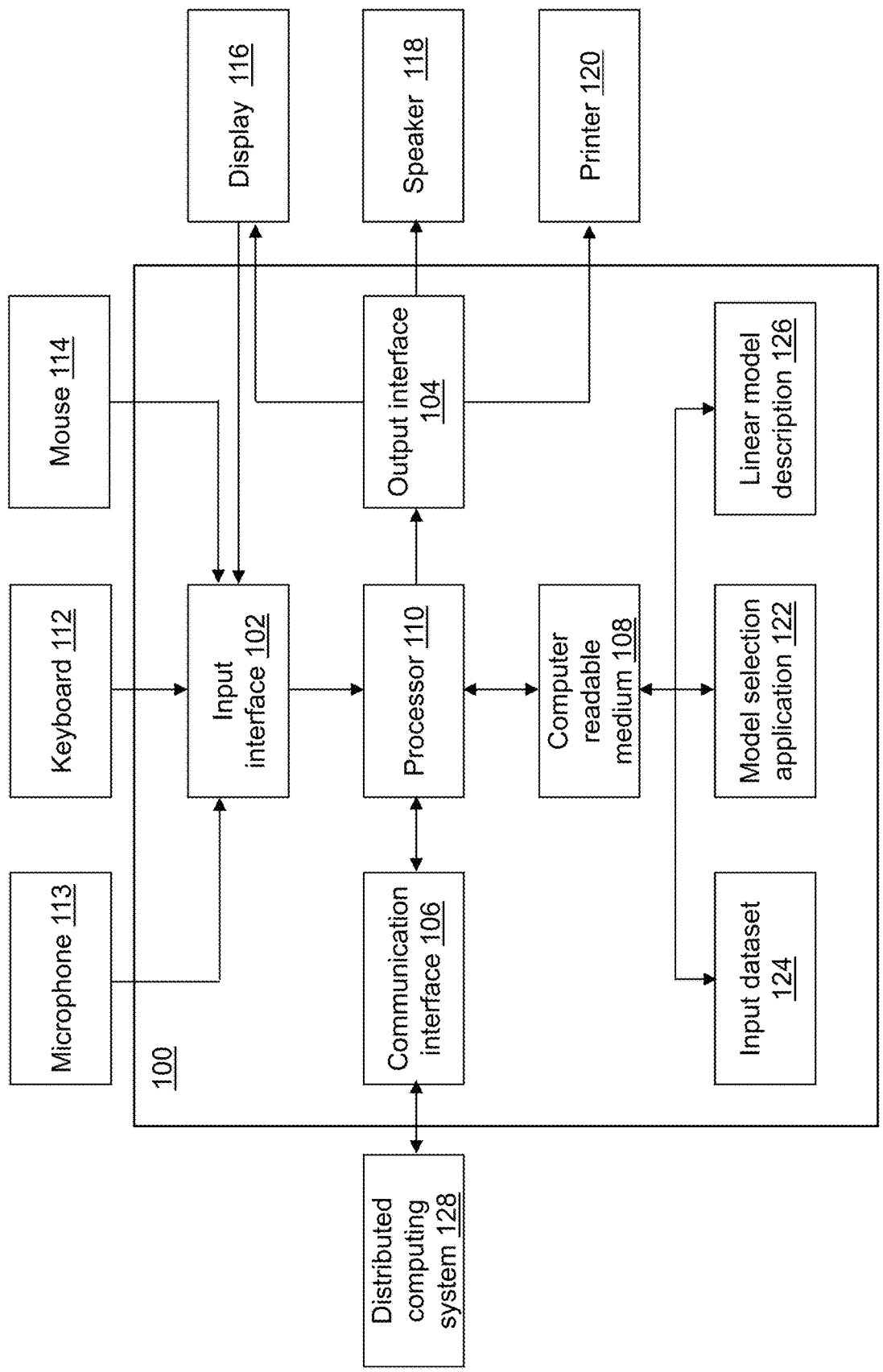
FIG. 1 depicts a block diagram of a model selection device in accordance with an illustrative embodiment.

Referring to FIG. 1, a block diagram of a model selection device 100 is shown in accordance with an illustrative embodiment. Model selection device 100 provides streamlined, two-stage, interactive model selection based on analysis of parameter estimates computed for a nonlinear model. Model selection device 100 may include an input interface 102, an output interface 104, a communication interface 106, a non-transitory computer-readable medium 108, a processor 110, a model selection application 122, an input dataset 124, and a linear model description 126. Model selection application 122 provides an interactive and intuitive graphical user interface for users to directly build models that allow them to identify how the data stored in input dataset 124 may impact a response. The analytic and model information may be stored in linear model description 126 for use as a trained model to predict new responses.

Fewer, different, and/or additional components may be incorporated into model selection device 100.

Input dataset 124 includes functional data that provides information about response curves, surfaces, etc. that vary over a continuum such as time, spatial location, wavelength, probability, etc. Functional data may be considered multivariate data with order on its dimensions. For example, input dataset 124 may be created from experiments or observational studies.

A goal of a design of experiments (DOE) is to describe and explain a variation of information under conditions hypothesized to reflect a variation in one or more dependent variables, also referred to as output variables or response variables, based on one or more independent variables, also referred to as input variables or explanatory variables. The one or more independent variables associated with the one or more dependent variables may further be associated with a group variable that may be defined based on each unique experiment. Using the group variable, the variation associated with the one or more independent variables associated with the one or more dependent variables captures a behavior under one or more experimental conditions. One or more factor variables further may be evaluated as part of the model selection to determine their relationship to the one or more dependent variables. The one or more factor variables may be observed during each experiment.

Model selection application 122 performs operations associated with defining linear model description 126 from data stored in input dataset 124 and with allowing the user of model selection device 100 to interactively select the model input parameters, also referred to as hyperparameters, based on information presented in display 116. Linear model description 126 may be used to predict a response variable value for data stored in an input dataset 524 (shown referring to FIG. 5) based on a relationship identified between the one or more response variables as a function of the one or more explanatory variables. In the alternative or in addition, linear model description 126 may be used to interactively evaluate the effect of the one or more factor variables on the one or more response variables and/or to identify the one or more factor variables that are useful in training another predictive model to predict a response variable value for data stored in a training dataset 924 (shown referring to FIG. 9).

Model selection application 122 is easy to use and provides approximately instantaneous feedback so that the user can quickly and efficiently adjust model parameters. Alternative solutions require the user to manually create, merge, and store data generated by a first stage of the analysis for input to the second stage to perform another part of the analysis, while model selection application 122 allows the user to easily change all or any subset of the data analysis or model design parameters as needed to effectively explore, understand, and model the data stored in input dataset 124. Unlike some alternative solutions, the user is not required to write any code to perform the two-stage processing.

Input interface 102 provides an interface for receiving information from the user or another device for entry into model selection device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model selection device 100 or to make selections presented in a user interface displayed on display 116.

The same interface may support both input interface 102 and output interface 104. For example, display 116 comprising a touch screen provides a mechanism for user input and for presentation of output to the user. Model selection device 100 may have one or more input interfaces that use the same or a different input interface technology. The input interface technology further may be accessible by model selection device 100 through communication interface 106.

Output interface 104 provides an interface for outputting information for review by a user of model selection device 100 and/or for use by another application or device. For example, output interface 104 may interface with various output technologies including, but not limited to, display 116, a speaker 118, a printer 120, etc. Model selection device 100 may have one or more output interfaces that use the same or a different output interface technology. The output interface technology further may be accessible by model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model selection device 100 may have one or more communication interfaces that use the same or a different communication interface technology. For example, model selection device 100 may support communication using an Ethernet port, a Bluetooth antenna, a telephone jack, a USB port, etc. Data and messages may be transferred between model selection device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model selection device 100 also may have one or more drives that support the loading of a memory media such as a CD, DVD, an external hard drive, etc. One or more external hard drives further may be connected to model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model selection device 100 may include a plurality of processors that use the same or a different processing technology.

Some or all of the operations described herein may be embodied in model selection application 122. The operations may be implemented using hardware, firmware, software, or any combination of these methods. Referring to the example embodiment of FIG. 1, model selection application 122 is implemented in software (comprised of computer-readable and/or computer-executable instructions) stored in computer-readable medium 108 and accessible by processor 110 for execution of the instructions that embody the operations of model selection application 122. Model selection application 122 may be written using one or more programming languages, assembly languages, scripting languages, etc.

Model selection application 122 may be integrated with other analytic tools. As an example, model selection application 122 may be part of an integrated data analytics software application and/or software architecture such as that offered by SAS Institute Inc. of Cary, N.C., USA. For example, model selection application 122 may be integrated with a prediction application 522 (shown referring to FIG. 5) and/or with a model training application 922 (shown referring to FIG. 9). Merely for illustration, model selection application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Model selection application 122 may be implemented as a Web application. For example, model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables may include a response variable Y and one or more explanatory variables that define an explanatory vector X for each observation vector.

input dataset 124 may include additional variables that are not the response variable Y or one of the explanatory variables included in explanatory vector X. For example, input dataset 124 may include a group variable g that separately identifies each experiment as well as one or more factor variables f. Based on this, an observation vector may be defined as $(y_i, X_i, g_i, f_i)$ that may include a value for each of the response variable Y, the one or more explanatory variables of explanatory vector X, the group variable g, and the one or more factor variables f associated with an $i^{th}$ observation vector i. One or more variables of the plurality of variables may describe a characteristic of a physical object. For example, if input dataset 124 includes data related to a drug experiment, the data may include a subject identifier, a time, a gender indicator, a drug preparation indicator, a body mass index (BMI) value, a concentration value, etc.

input dataset 124 may include data captured as a function of time for one or more physical objects. The data stored in input dataset 124 may be generated by and/or captured from a variety of sources including one or more sensors of the same or different type, one or more computing devices, etc. Data stored in input dataset 124 may be sensor measurements or signal values captured by a sensor, may be generated or captured in response to occurrence of an event or a transaction, generated by a device such as in response to an interaction by a user with the device, etc. For example, in data science, engineering, and statistical applications, data often consists of multiple measurements (across sensors, characteristics, responses, etc.) collected across multiple time instances (patients, test subjects, experiments, geographic locations, etc.). These measurements may be collected in input dataset 124 for analysis and processing. The data stored in input dataset 124 may be captured at different time points periodically, intermittently, when an event occurs, etc. One or more columns of input dataset 124 may include a time and/or a date value.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA.

input dataset 124 may include data captured at a high data rate such as 200 or more observation vectors per second for one or more physical objects of the same or different type. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

input dataset 124 may be stored using various data structures as known to those skilled in the art including one or more files of a file system, a relational database, one or more tables of a system of tables, a structured query language database, a SAS® dataset, etc. on model selection device 100 or on distributed computing system 128. The data may be organized using delimited fields, such as comma or space separated fields, fixed width fields, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

input dataset 124 may be stored on computer-readable medium 108 or on one or more computer-readable media of distributed computing system 128 and accessed by model selection device 100 using communication interface 106, input interface 102, and/or output interface 104. Model selection device 100 may coordinate access to input dataset 124 that is distributed across distributed computing system 128 that may include one or more computing devices. For example, input dataset 124 may be stored in a cube distributed across a grid of computers as understood by a person of skill in the art. As another example, input dataset 124 may be stored in a multi-node Hadoop cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS LASR™ Analytic Server may be used as an analytic platform to enable multiple users to concurrently access data stored in input dataset 124. The SAS Viya™ open, cloud-ready, in-memory architecture also may be used as an analytic platform to enable multiple users to concurrently access data stored in input dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Figure 2:
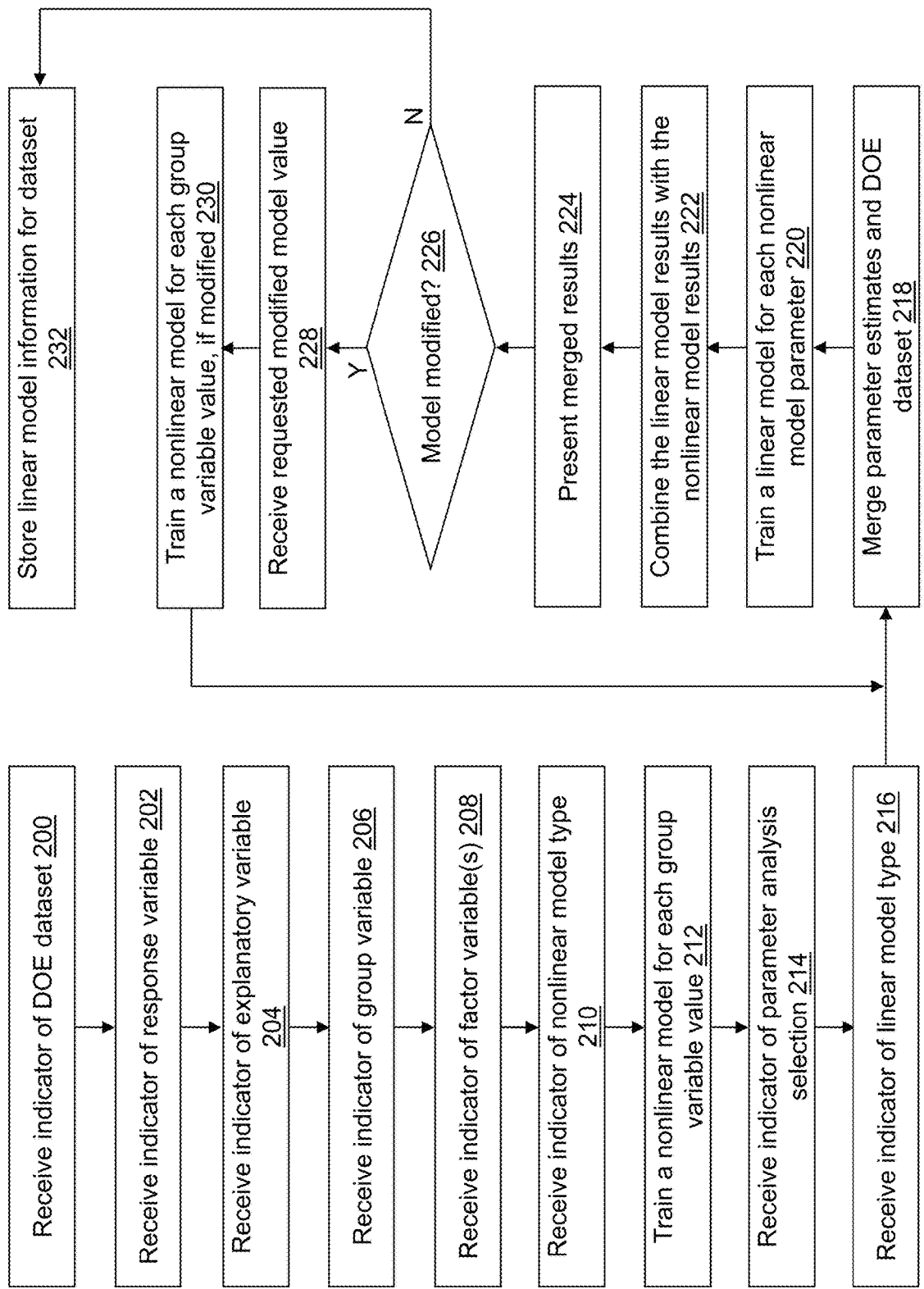
FIG. 2 depicts a flow diagram illustrating examples of operations performed by a model selection application of the model selection device of FIG. 1 in accordance with an illustrative embodiment.

Referring to FIG. 2, example operations associated with model selection application 122 are described. Additional, fewer, or different operations may be performed depending on the embodiment of model selection application 122. The order of presentation of the operations of FIG. 2 is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute model selection application 122, which causes presentation of a first user interface window, which may include a plurality of menus and selectors such as drop-down menus, buttons, text boxes, hyperlinks, etc. associated with model selection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by model selection application 122.

Referring to FIG. 2, in an operation 200, a first indicator may be received that indicates input dataset 124. For example, the first indicator indicates a location and a name of input dataset 124. As an example, the first indicator may be received by model selection application 122 after selection from a user interface window or after entry by a user into a user interface window. In an alternative embodiment, input dataset 124 may not be selectable. For example, a most recently created dataset may be used automatically.

In an operation 202, a second indicator may be received that indicates response variable Y in input dataset 124. For example, the second indicator may indicate a column number or a column name. As another option, a first or a last column of input dataset 124 may be assumed to be the response variable Y column.

In an operation 204, a third indicator may be received that indicates one or more explanatory variables in input dataset 124. For example, the third indicator may indicate a column number or a column name for each of the one or more explanatory variables. Explanatory vector X may include one or more variable values each of which is associated with a respective explanatory variable.

In an operation 206, a fourth indicator may be received that indicates and a group variable g in input dataset 124. For example, the fourth indicator may indicate a column number or a column name for the group variable g.

In an operation 208, a fifth indicator may be received that indicates one or more factor variables f in input dataset 124. For example, the fifth indicator may indicate a column number or a column name for each of the one or more factor variables f.

Figure 7:
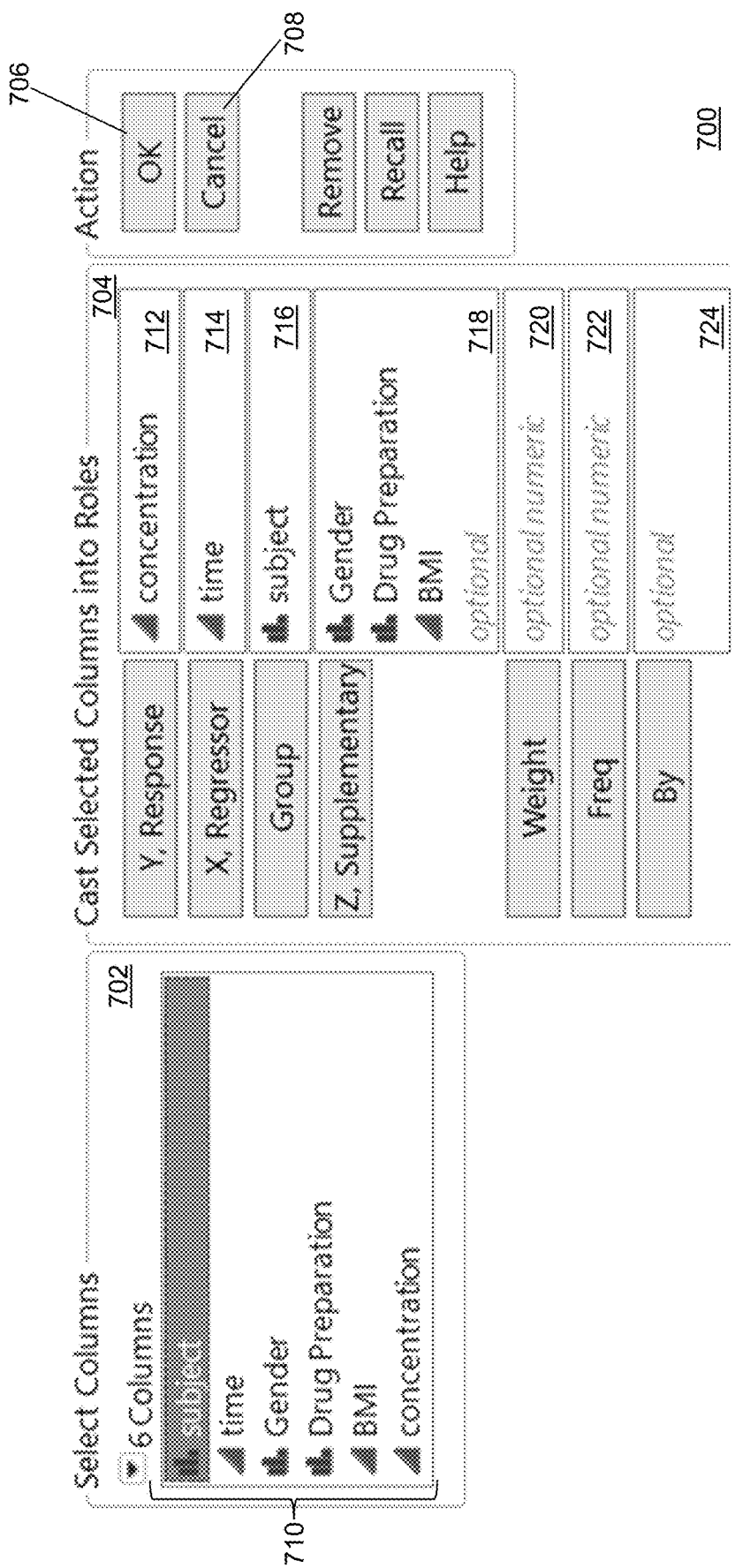

For illustration, referring to FIG. 7, an input window 700 is shown in accordance with an illustrative embodiment. Input window 700 may include a variable list section 702, a role selection section 704, an ok selector 706, and a cancel selector 708. Variable list section 702 may include a list of variables 710 read from input dataset 124 based on a name associated with each column. For example, role selection section 704 of input window 700 can be used to select the one or more response variables Y using a y-variable selector 712, to select explanatory variable X using an x-variable selector 714, to select group variable g using a group variable selector 716, and to select the one or more factor variables f using f-variable selector 718.

In the illustrative embodiment, y-variable selector 712 has been used to define the second indicator as having the column name "concentration", x-variable selector 714 has been used to define the third indicator as having the column name "time", group variable selector 716 further has been used to define the third indicator as having the column name "subject" for group variable g, and f-variable selector 718 has been used to define the fourth indicator as including three variables associated with column names "Gender", "Drug Preparation", and "BMI". Group variable g can be used to identify if there is more than one function in input dataset 124. For example, a distinct function may be defined for each patient or each experiment included in input dataset 124.

Role selection section 704 of input window 700 may further include a weight selector 720, a frequency selector 722, and a filter selector 724. Weight selector 720 indicates a column name of a column used to indicate a weight applied to a respective observation vector. Frequency selector 722 indicates a column name of a column whose numeric values assign a frequency to each row in input dataset 124. Filter selector 724 indicates a column name of a column whose levels define separate analyses.

Figure 3A:
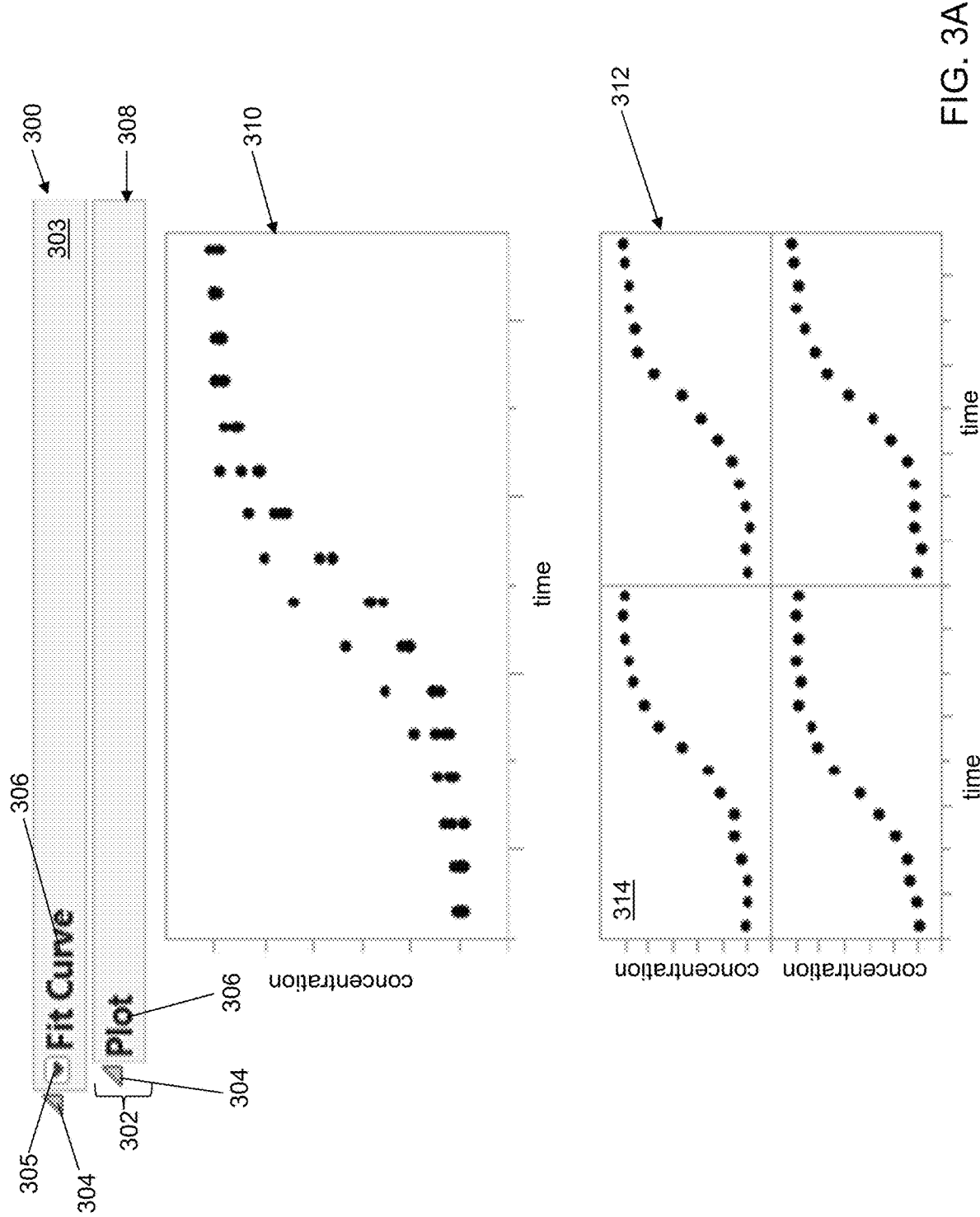
FIGS. 3A to 3F, 4A to 4H, and 7 show a user interface supported by the model selection application of FIG. 2 used to interactively select a model in accordance with an illustrative embodiment.

Selection of cancel selector 708 clears any user selection in role selection window 704 and may close or collapse input window 700. Selection of ok selector 706 saves the current user selections in role selection window 704, collapses, and automatically generates a graph of the results. For illustration, referring to FIG. 3A, a data explorer window 300 is shown in accordance with an illustrative embodiment. FIGS. 3A to 3F and 4A to 4H show data explorer window 300 and various sub-windows of data explorer window 300 in accordance with an illustrative embodiment.

Data explorer window 300 may include a hierarchy of sub-windows 302 that changes as selections are made using selectors presented in data explorer window 300. Data explorer window 300 may include a data explorer header bar 303. The hierarchy of sub-windows 302 descend hierarchically from data explorer header bar 303 because they are associated with a functional data exploration of input dataset 124. Data explorer header bar 303 may include an open/close sub-window selector 304, an open/close menu selector 305, and a header title 306. Successive selection of open/close sub-window selector 304 toggles between opening and closing the hierarchy of sub-windows 302. When toggled closed, open/close sub-window selector 304 may appear as a forward arrow in contrast to the right triangle shown in the illustrative embodiment. Open/close menu selector 305 toggles between showing and not showing a menu of selections associated with data explorer window 300. Text to the right of open/close menu selector 305 defines header title 306 that summarizes a content of data explorer window 300.

Though not labeled for simplicity, each sub-window of data explorer window 300 may include a respective open/close sub-window selector 304, open/close menu selector 305, and header title 306. An indentation level of each sub-window included in the hierarchy of sub-windows 302 may indicate a child and/or sibling relationship between the hierarchy of sub-windows 302 that are all child windows of data explorer window 300. Again, based on selections in open/close menu selector 305 associated with data explorer window 300 and each sub-window of data explorer window 300, the child windows of the hierarchy of sub-windows 302 may change.

After selection of ok selector 306, the hierarchy of sub-windows 302 may include a plot sub-window 308. Plot sub-window 308 includes open/close sub-window selector 304, header title 306, a response graph 310, and a plurality of experiment response graphs 312, but not open/close menu selector 305 because plot sub-window 308 does not include a menu of options.

The plurality of experiment response graphs 312 includes an experiment response graph for each value of the group variable g in input dataset 124 selected using group variable selector 316. For example, a first experiment response graph 314 shows the response graph that results for a first value of the group variable g in input dataset 124. Response graph 310 includes a graph of response variable Y selected using y-variable selector 312 as a function of the explanatory variable X selected using x-variable selector 314. Response graph 310 includes a curve plotted for each value of the group variable g in input dataset 124 selected using group variable selector 316. Each curve may be shown using a different color, symbol, line type, etc. or otherwise labeled to distinguish each value of the group variable g.

Figure 8:
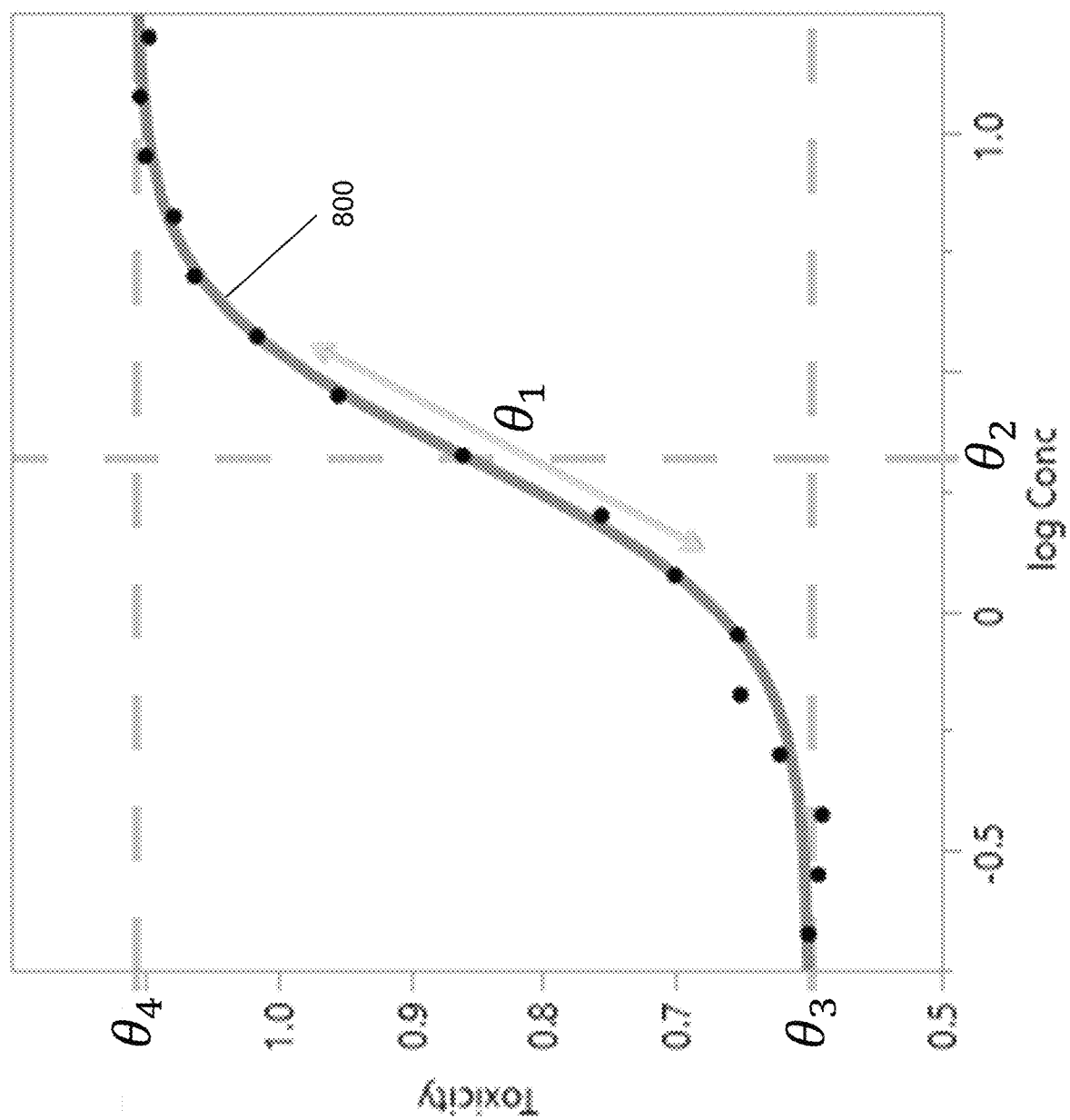
FIG. 8 shows a nonlinear model in accordance with an illustrative embodiment.

Referring again to FIG. 2, in an operation 210, a sixth indicator may be received that indicates a nonlinear model type. For example, the sixth indicator indicates a name of a nonlinear model type. A nonlinear model type models a behavior of response variable Y given explanatory variable X. A nonlinear model is created by fitting the indicated nonlinear model type to the columns of data identified in input dataset 124 using the second through fifth indicators to define a parameter estimate for each parameter of the indicated nonlinear model type and for each value of the group variable g. Nonlinear regression is a form of regression where the response variable Y is a nonlinear combination of parameters and independent variables such as $(X_i, f_i)$. In science and engineering applications, nonlinear models are often parameterized to provide a meaningful interpretation. For example, referring to FIG. 8, a response curve 800 describes a toxicity of a compound as a function of a log of a concentration level. For example, response curve 800 can be described by $$y = \theta_3 + \frac{\theta_4 - \theta_3}{1 + \exp(-\theta_1 * (x - \theta_2))},$$

which is a logistic 4P model type, where y is the toxicity, x is the concentration level, $\theta_1$ is a slope or growth rate, $\theta_2$ is an inflection point, $\theta_3$ is a lower asymptote, and $\theta_4$ is an upper asymptote. The parameters of the nonlinear model are $\{\theta_1, \theta_2, \theta_3, \theta_4\}$ and are illustrated in FIG. 8.

The sixth indicator may be received by model selection application 122 after selection from a user interface window or after entry by a user into a user interface window. A default value for the nonlinear model type may further be stored, for example, in computer-readable medium 108. As an example, the nonlinear model type may be selected from "Polynomials", "Sigmoid Curves", "Exponential Growth and Decay", "Peak Models", "Pharmacokinetic Models", "Fit Michaelis-Menten", etc. For example, a default type of nonlinear model type may be indicated by "Pharmacokinetic Models", which indicates a model of a concentration of drugs in a body. Selection of the "Pharmacokinetic Models" nonlinear model type fits a one compartment oral dose model, a two compartment IV bolus dose model, and/or a biexponential 4P model. Selection of the "Polynomials" nonlinear model type fits a first degree to fifth degree polynomial to the columns of data identified in input dataset 124.

Selection of the "Sigmoid Curves" nonlinear model type fits logistic, probit, Gompertz, and/or Weibull models based on a second user selection. These models are S-shaped and have both upper and lower asymptotes. Examples of use of sigmoid curves may be for learning curves and modeling tumor growth, both of which increase initially and then taper off.

Selection of the "Exponential Growth and Decay" nonlinear model type fits exponential, biexponential, mechanistic growth, and/or cell growth models based on a second user selection. Examples of use of exponential growth and decay models may be for virus spread and drug half-life, respectively.

Selection of the "Peak Models" nonlinear model type fits Gaussian peak and/or Lorentzian peak models input dataset 124. These models increase up to a peak and then decrease. For illustration, the Gaussian peak model is a scaled version of the Gaussian probability density function. The Lorentzian peak model is a scaled version of the Cauchy distribution. Examples of use of peak models may be for some chemical concentration assays, artificial neural networks, etc.

Selection of the "Fit Michaelis-Menten" nonlinear model type fits a Michaelis-Menten biochemical kinetics model, which relates the rate of enzymatic reactions to substrate concentration.

Of course, the nonlinear model type may be labeled or selected in a variety of different manners by the user as understood by a person of skill in the art. In an alternative embodiment, the nonlinear model type may not be selectable, and a single nonlinear model type is implemented by model selection application 122. For example, the nonlinear model type indicated as "Pharmacokinetic Models" may be used by default or without allowing a selection. Illustrative selections are further described in Chapter 13 titled "Fit Curve" of Predictive and Specialized Modeling version 15.1, published by JMP, a business unit of SAS Institute Inc. of Cary, N.C., USA (September 2019)(Fit Curve).

Figure 3B:
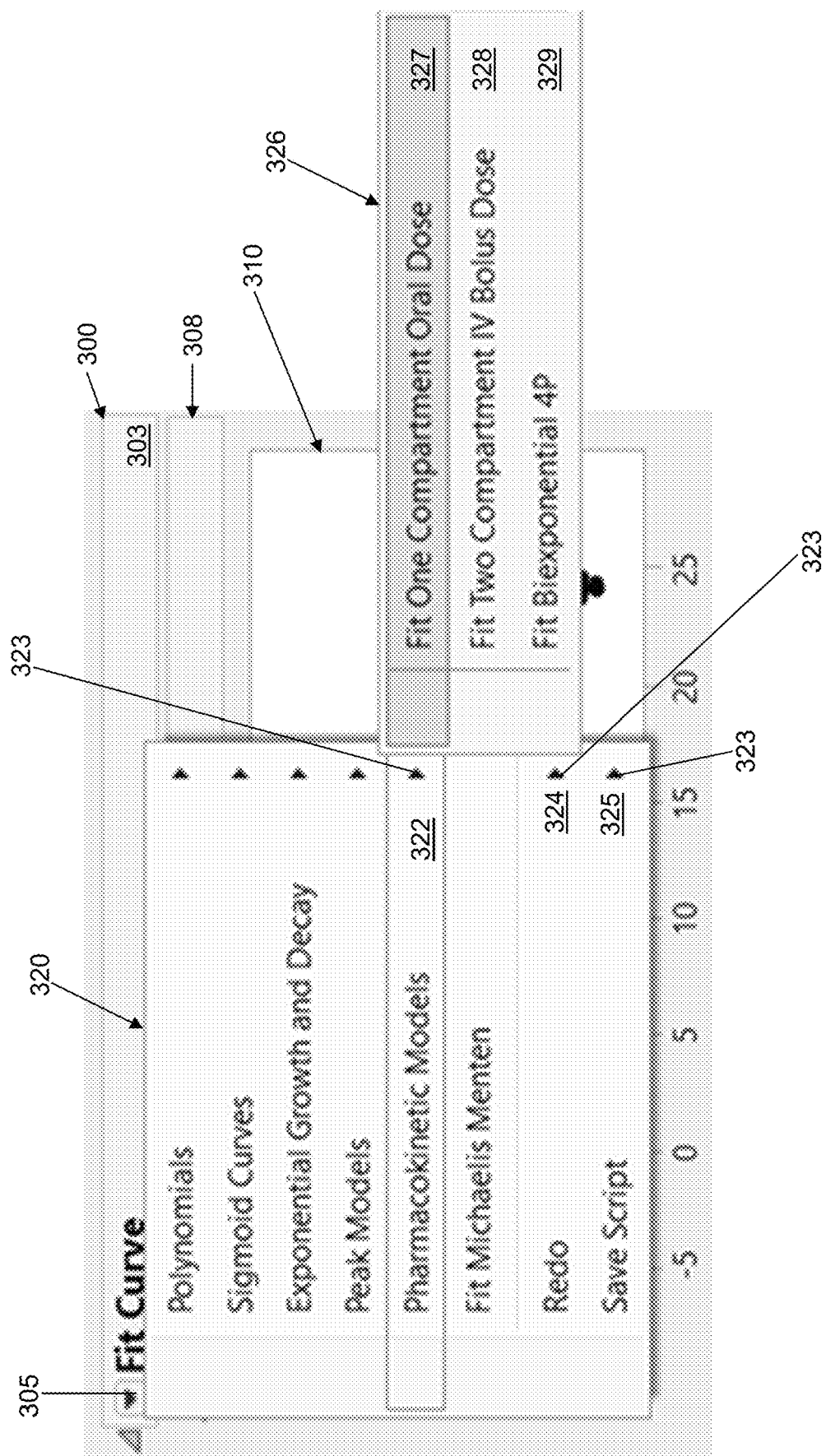
Figure 3C:
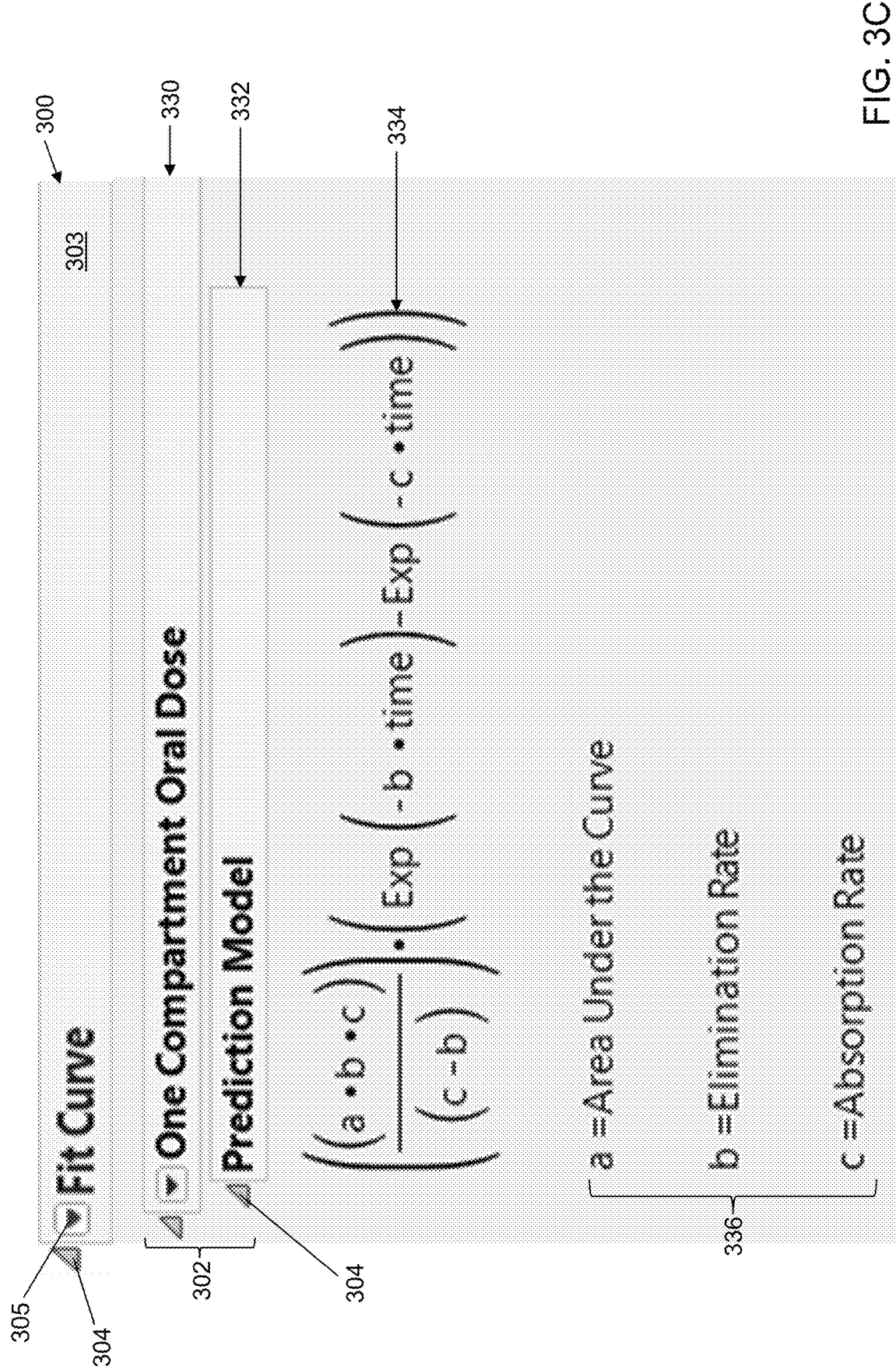
Figure 3D:
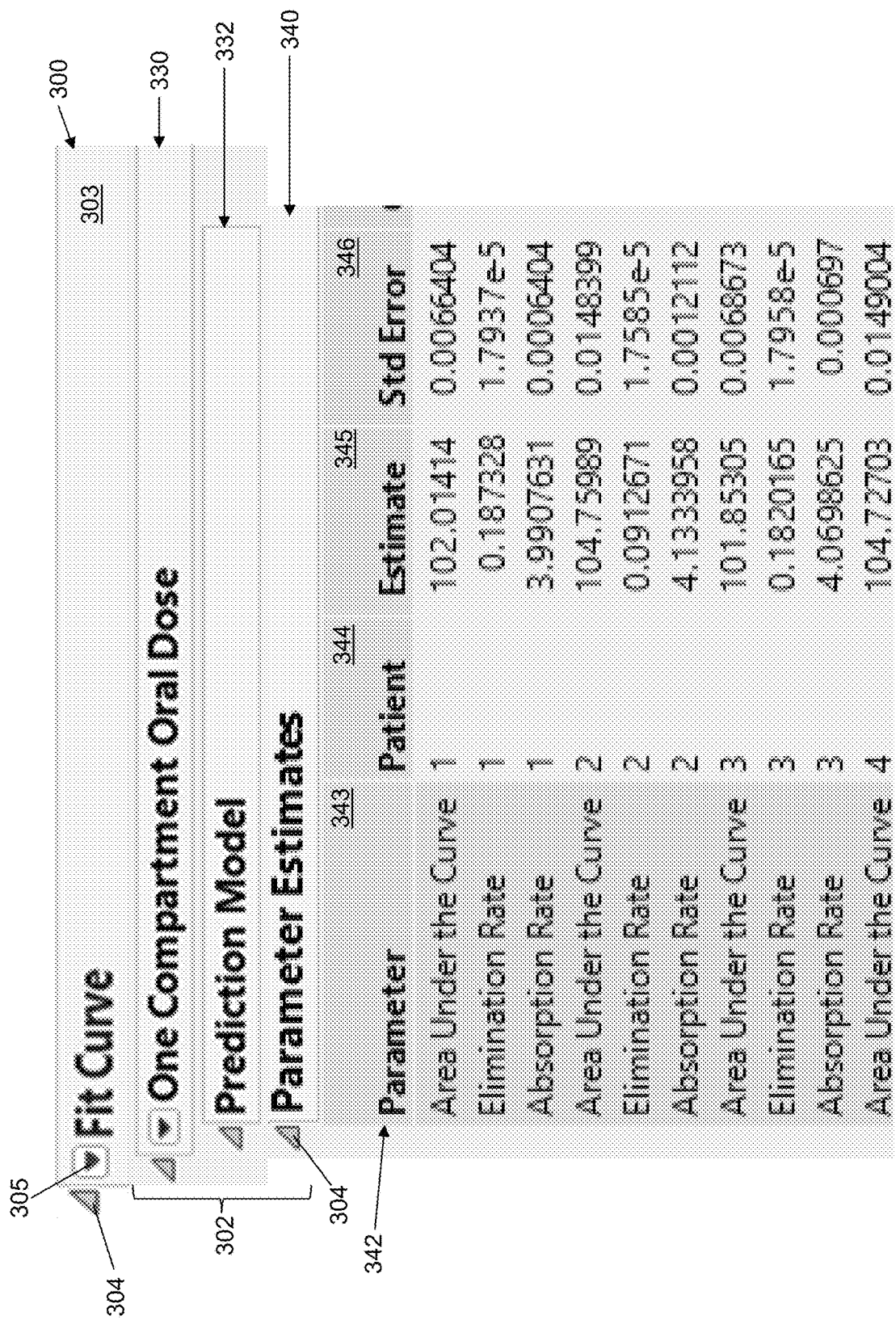

For example, referring to FIG. 3B, after selection of open/close menu selector 305 of data explorer window 300, an options menu 320 may be presented in display 116 in accordance with an illustrative embodiment. Options menu 320 may include a selector for each nonlinear model type, a redo selector 324, and a save script selector 325. A forward arrow 323 associated with any of the selectors of options menu 320 may indicate that selection of the respective selector results in a sub-menu of options menu 320. For example, selection of forward arrow 323 of a pharmacokinetic model type selector 322 presents selectors related to selection of a more specific model type or a sub-type of the pharmacokinetic model type. For example, selection of forward arrow 323 associated with selector pharmacokinetic model type selector 322 may result in presentation of a model sub-menu 326 that may include a one compartment oral dose model selector 327, a two compartment IV bolus dose model selector 328, and a biexponential 4P model selector 329, where one compartment oral dose model selector 327 is highlighted indicating its current selection by the user. A greater or a fewer number of nonlinear model types and/or sub-types may be included in options menu 320 and/or model sub-window 326 in alternative embodiments. The sixth indicator may be received by model selection application 122 after the user selects a nonlinear model type and/or sub-type from options menu 320. Selection of the nonlinear model type and/or sub-type may result in training of the selected nonlinear model type using default values or other values modified by the user, for example, as further described in Fit Curve.

Selection of forward arrow 323 of redo selector 324 presents selectors related to repeating or relaunching an analysis. Selection of forward arrow 323 of save script selector 325 presents selectors related to saving a script that can reproduce response graph 310.

Referring again to FIG. 2, in an operation 212, the selected nonlinear model type is trained using observation vectors from input dataset 124 based on each value of the group variable g. For example, a first nonlinear model is computed for a first value of the group variable g, a second nonlinear model is computed for a second value of the group variable g, and so on. A parameter estimate is defined for each parameter included in the selected nonlinear model type and for each value of the group variable g. For example, referring to FIG. 3C, after selection of the one compartment oral dose pharmacokinetic model type using one compartment oral dose model selector 327, a model sub-window 330 may be included as part of the hierarchy of sub-windows 302 and is a child window of data explorer window 300. Selection of open/close sub-window selector 304 of model sub-window 330 may trigger presentation of a model description sub-window 332 that is a child window of model sub-window 330. Selection of open/close sub-window selector 304 of model description sub-window 332 may trigger presentation of a model equation 334 and a plurality of parameters 336 that are determined by training the selected nonlinear model type for each value of the group variable g. For example, in the illustrative example of the one compartment oral dose pharmacokinetic model type, there are three parameters, "a" that is an area under a curve, "b" that is an elimination rate, and "c" that is an absorption rate. The explanatory variable X in the illustrative example of the one compartment oral dose pharmacokinetic model type is "time" and is also shown in model equation 334.

A value for the response variable Y can be determined for any value of the explanatory variable X once the nonlinear model is trained to define each of the plurality of parameters for each value of the group variable g. For example, referring to FIG. 3D, after each model is trained, a parameter estimates sub-window 340 may be included as part of the hierarchy of sub-windows 302 and is a child window of model sub-window 330. Selection of open/close sub-window selector 304 of parameter estimates sub-window 340 may trigger presentation of a parameter estimates table 342 that includes a parameter column 343, a group identifier (ID) column 344, an average value column 345, a standard error column 346, a chi-squared statistic column (not shown), a p-value column (not shown), a confidence interval column (not shown), a correlation value column (not shown), a covariance value column (not shown), etc. Each row of the table shows the statistics values associated with the parameter indicated in parameter column 343 for the value of the group variable g indicated in group ID column 344. For example, rows 1 through 3 of parameter estimates table 342 show the parameter estimates for a subject "1", rows 4 through 6 of parameter estimates table 342 show the parameter estimates for a subject "2", rows 7 through 9 of parameter estimates table 342 show the parameter estimates for a subject "3", and so on for each value of the group variable g.

Though not shown, a summaries sub-window is a child window of model sub-window 330 that may present fit statistics such as a corrected Akaike information criterion (AIC) (AICc), a AICc weight, a Bayesian information criterion (BIC), a sum of the squared differences (SSE), an average of squares of the errors (MSE), a square root of the MSE (RMSE), provides a proportion of variation in response variable Y that can be attributed to the model rather than to random error (R-Square), etc. AICc provides a measure of a goodness of fit of an estimated statistical model that can be used to compare two or more models. AICc is a modification of the AIC adjusted for small samples. A model with the lowest AICc value is the best. AICc Weight provides normalized AICc values that sum to one. The AICc weight can be interpreted as a probability that a particular model is the true model given that one of the fitted models is the truth. Therefore, the model with the AICc weight closest to one has the best fit. BIC provides a measure based on a likelihood function of model fit that is helpful when comparing different models. The model with the lower BIC value is the better fit. SSE provides a sum of the squared differences between each observation and its predicted value. MSE provides an average of the squares of the errors of each value. RMSE provides a square root of the MSE that estimates the standard deviation of the random error. R-square estimates provides a proportion of variation in response variable Y that can be attributed to the model rather than to random error. The model with the R-Square value closest to one provides a better fit.

Figure 3E:
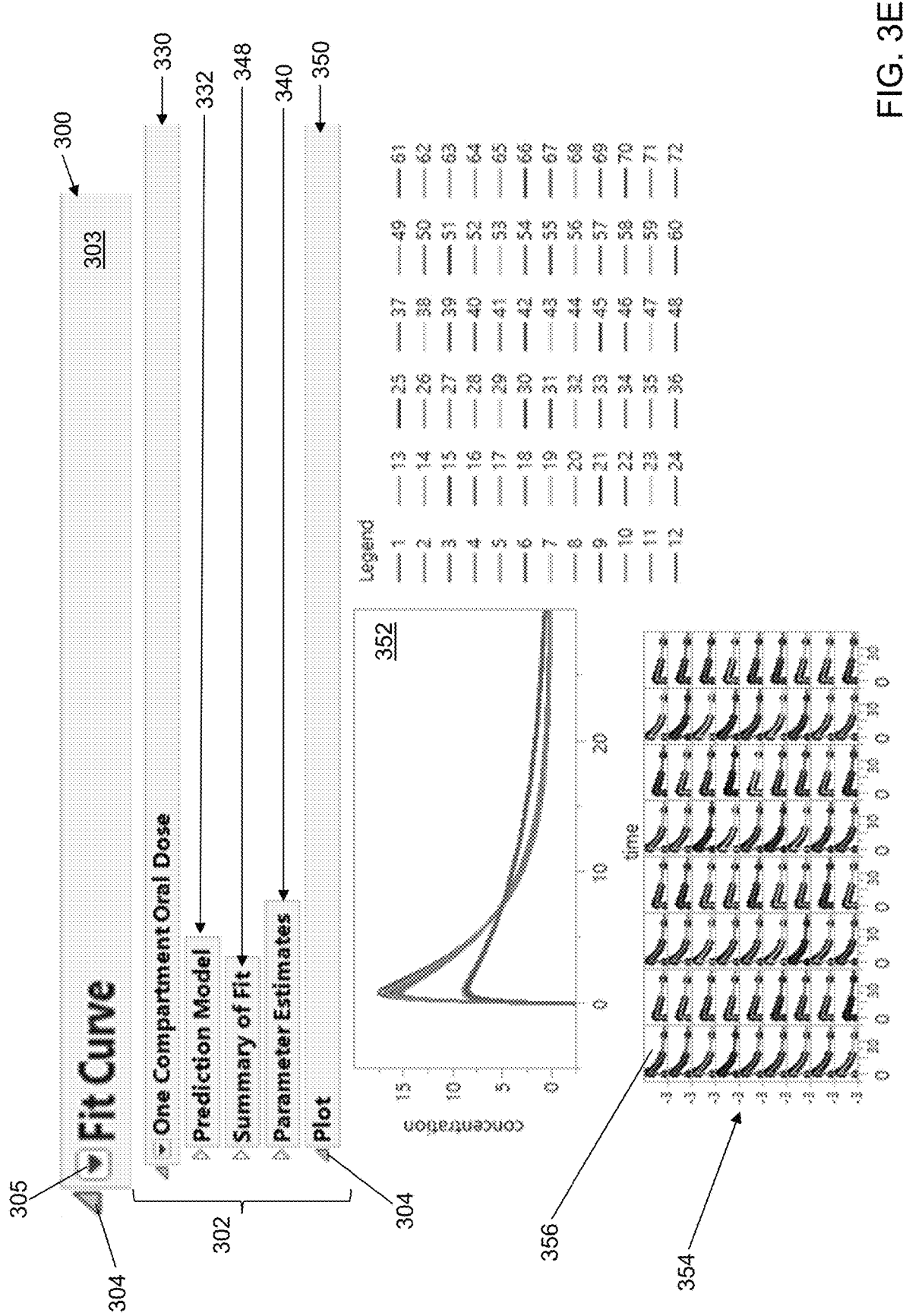
Figure 3F:
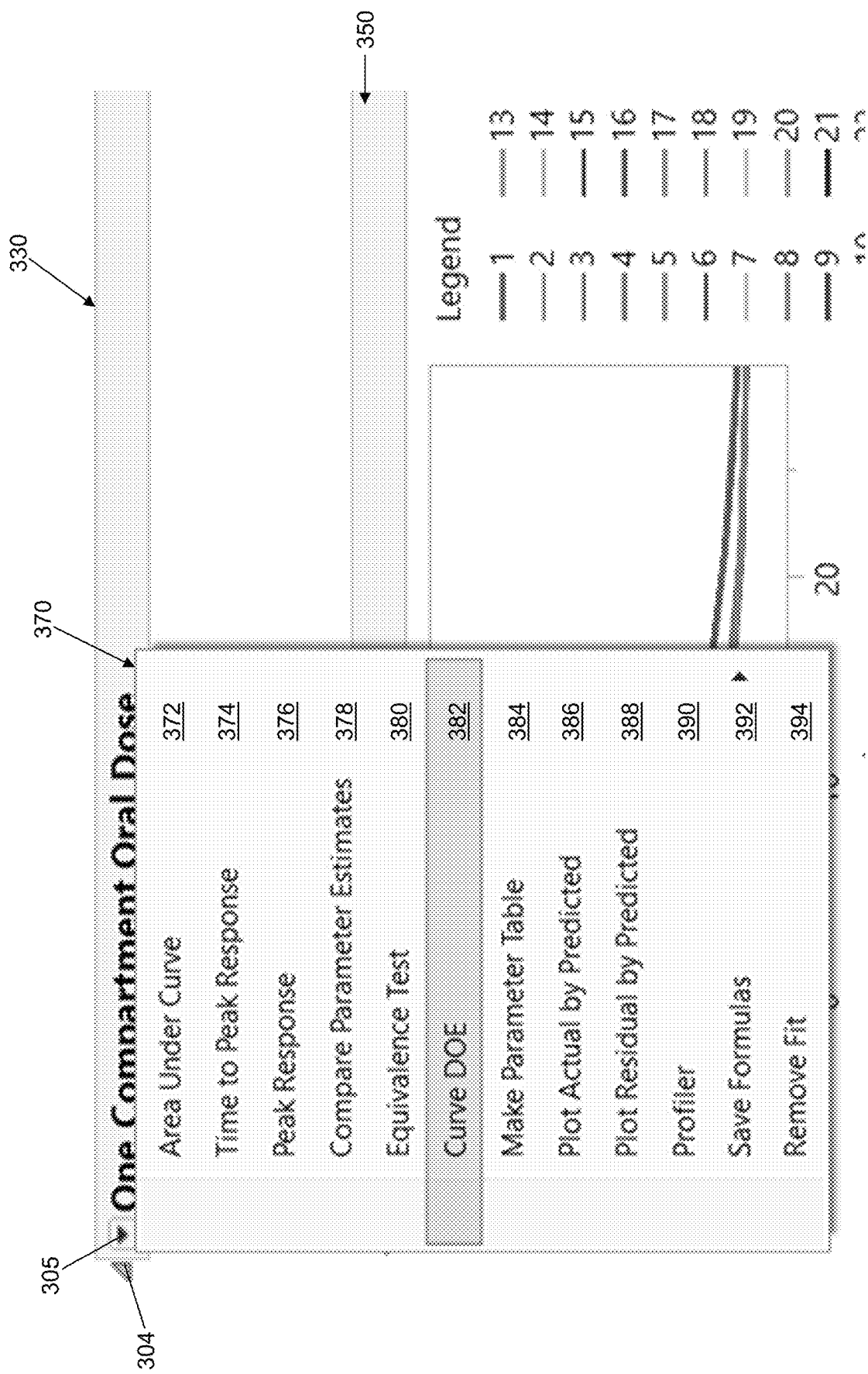

Referring to FIG. 3E, after each model is trained, a plot sub-window 350 may be included as part of the hierarchy of sub-windows 302 and is a child window of model sub-window 330. Selection of open/close sub-window selector 304 of plot sub-window 350 may trigger presentation of a trained response graph 352, and a plurality of experiment trained response graphs 354. Trained response graph 352 shows predicted values of the response variable Y for each value of the grouped variable g on a vertical axis and the explanatory variable X on the horizontal axis, where the predicted values were predicted by the trained model using the parameter estimates computed for each value of the grouped variable g. Each curve may be shown using a different color, symbol, line type, etc. or otherwise labeled to distinguish each value of the group variable g.

The plurality of trained response graphs 354 includes a experiment trained response graph for each value of the group variable g in input dataset 124 selected using group variable selector 316. For example, because there are 72 patients as subjects, there are 72 trained response graphs included in the plurality of trained response graphs 354. A first experiment trained response graph 356 shows the response graph that results for a first value of the group variable g in input dataset 124 associated with a first patient.

Referring again to FIG. 2, in an operation 214, a seventh indicator may be received that indicates a parameter analysis selection. For illustration, referring to FIG. 3F, after selecting open/close menu selector 305 of model sub-window 330, an analysis options menu 370 is presented. Analysis options menu 370 may include an area under curve (AUC) selector 372, a time to peak response selector 374, a peak response selector 376, a compare parameter estimates selector 378, an equivalence test selector 380, a parameter analysis selector 382, a make parameter table selector 384, an actual by predicted selector 386, a residual by predicted selector 388, a profiler selector 390, a save formulas selector 392, and a remove fit selector 394.

Selection of AUC selector 372 presents a plot of an area under a fitted curve defined by the trained nonlinear model. An analysis of means may be performed for comparing the estimates across each value of the grouped variable g. If the result for a group exceeds a decision limit, the result may be considered different from an overall mean of AUC. Selection of time to peak response selector 374 presents a plot of an estimate of a regressor at a peak of the fitted curve. A standard error of the estimate may also be presented. Selection of peak response selector 376 presents an estimate of values of the response variable Y at the peak of the fitted curve. A standard error of the estimate may also be presented.

Selection of compare parameter estimates selector 378 presents an analysis for testing an equality of parameters across different values of the grouped variable g. Selection of equivalence test selector 380 presents an analysis for testing an equivalence of the trained models defined for each value of the grouped variable g.

Selection of parameter analysis selector 382 triggers an indicator of a user request to perform analysis of the parameter estimates as described further below relative to FIGS. 4A to 4H.

Selection of make parameter table selector 384 presents parameter estimates sub-window 340. Selection of actual by predicted selector 386 presents a graph of actual values of the response variable Y on a vertical axis and the predicted values of the response variable Y on the horizontal axis. Selection of residual by predicted selector 388 presents a graph of residuals on a vertical axis and the predicted values of the response variable Y on the horizontal axis, where the residuals are computed as a difference between the actual values of the response variable Y and the predicted values. Selection of profiler selector 390 presents a profiler of a prediction function computed using parameter estimates from a group specified using a formulation selector (not shown). Illustrative groups are "standard" and "test". The derivatives are derivatives of the prediction function with respect to explanatory variable X.

Selection of save formulas selector 392 presents options for saving a variety of formula columns in a data table. For example, a prediction equation, a standard error of the predicted values, the prediction equation in parametric form, the residual values, a standardized residual divided by its estimated standard deviation, a first derivative of the prediction function with respect to explanatory variable X, an equation for the standard error of the first derivative, an equation for predicting explanatory variable X from response variable Y, etc. can optionally be saved, for example, to linear model description 126. Selection of remove fit selector 394 removes the data fit using the trained nonlinear model.

Referring again to FIG. 2, in an operation 216, an eighth indicator may be received that indicates a linear model type. For example, the eighth indicator indicates a name of a linear model type. The eighth indicator may be received by model selection application 122 after selection from a user interface window or after entry by a user into a user interface window. A default value for the linear model type may further be stored, for example, in computer-readable medium 108. As an example, the linear model type may be selected as "Generalized linear". For example, a default type of linear model type may be indicated by "Generalized linear", which applies regularized, or penalized, regression techniques. Of course, the linear model type may be labeled or selected in a variety of different manners by the user as understood by a person of skill in the art. In an alternative embodiment, the linear model type may not be selectable, and a single linear model type is implemented by model selection application 122. For example, the linear model type indicated as "Generalized linear" may be used by default or without allowing a selection.

Referring again to FIG. 2, in an operation 218, the parameter estimates are automatically merged with the one or more factor variables f from input dataset 124 defined in operation 208 to create a new data table of estimates of theta and merge in z values. An illustrative table I is shown below.

TABLE I

| Formulation | Growth Rate | Inflection Point | Lower Asymptote | Upper Asymptote | Z1 |
|---|---|---|---|---|---|
| Standard | 5.8434 | 0.32 | 0.599 | 1.11 | 0.2 |
| Test A | 5.981 | 0.28 | 0.591 | 1.10 | 0.3 |
| Test B | 5.756 | 0.08 | 0.593 | 1.10 | 0.2 |
| Test C | 6.01 | 0.298 | 0.593 | 1.10 | 0.3 |

Formulation is the grouping variable and z1 is the supplementary variable. The parameter estimates are included in the middle and come from the trained nonlinear model.

In an operation 220, a linear model is trained using the parameter estimates for the one or more group variables g where a type of the prediction model is the linear model type selected in operation 216. For example, a generalized linear model is fit to the parameter estimates for each parameter of the plurality of parameters of the nonlinear model using the one or more factor variables f as model effects to define a linear model for each parameter of the nonlinear model. Modeling the parameter estimates using the one or more factor variables f supports use of the model to determine how a response of response variable Y changes based on the one or more factor variables f.

In an operation 222, the trained linear model for each parameter is combined with the trained nonlinear model to get a response of response variable Y as a function of explanatory variable X and the one or more factor variables f. For illustration, the values from the linear model are substituted into the corresponding parameters in the nonlinear model. In notation form, $Y=f(x, \theta)$ is the trained nonlinear model, $\theta=z*\beta$ is the trained linear model for each $\theta$ parameter, and $Y=f(x, z, \beta)$, which expresses the trained nonlinear model as a function of x and the one or more supplementary variables. The new expression of Y is used to create the prediction profiler and save prediction formulas back to the data table.

In an operation 224, combined model execution results are presented. For example, selection of parameter analysis selector 382 triggers creation of a parameter analysis within data explorer window 300 automatically. For illustration, referring to FIGS. 4A to 4H, the hierarchy of sub-windows 302 is updated as a result of user selection of parameter analysis selector 382.

Figure 4A:
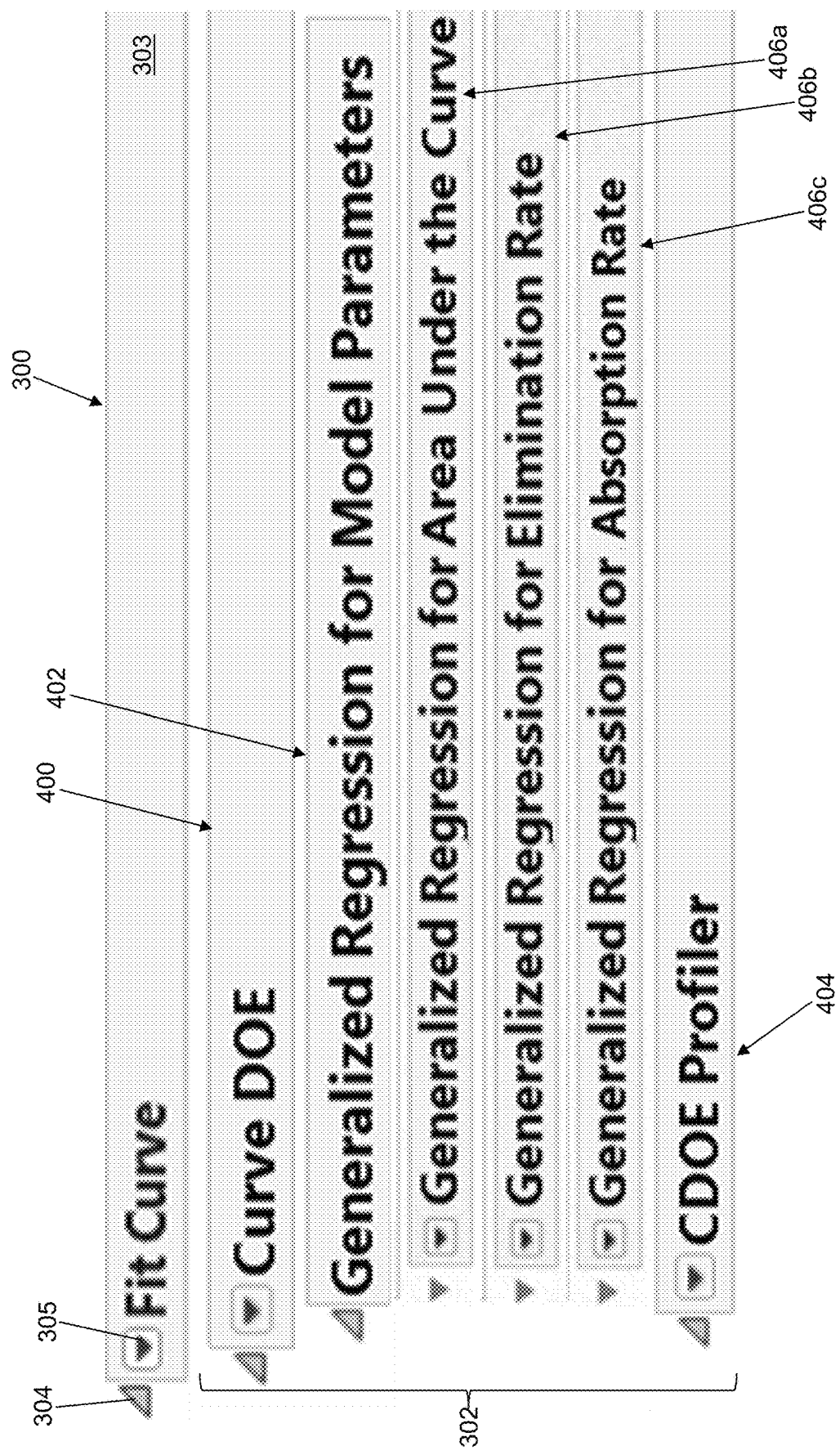

Referring to FIG. 4A, the updated hierarchy of sub-windows 302 may include an analysis sub-window 400, a linear model sub-window 402, a profiler sub-window 404, a first parameter model sub-window 406a, a second parameter model sub-window 406b, and a third parameter model sub-window 406c. Linear model sub-window 402 and profiler sub-window 404 are sub-windows of analysis sub-window 400. First parameter model sub-window 406a, second parameter model sub-window 406b, and third parameter model sub-window 406c are sub-windows of linear model sub-window 402. In the illustrative embodiment of FIG. 4A, there are three parameters resulting in three parameter model sub-windows with their associated child sub-windows. In alternative embodiments, there may be a fewer or a greater number of parameter model sub-windows and their associated child sub-windows.

Figure 4B:
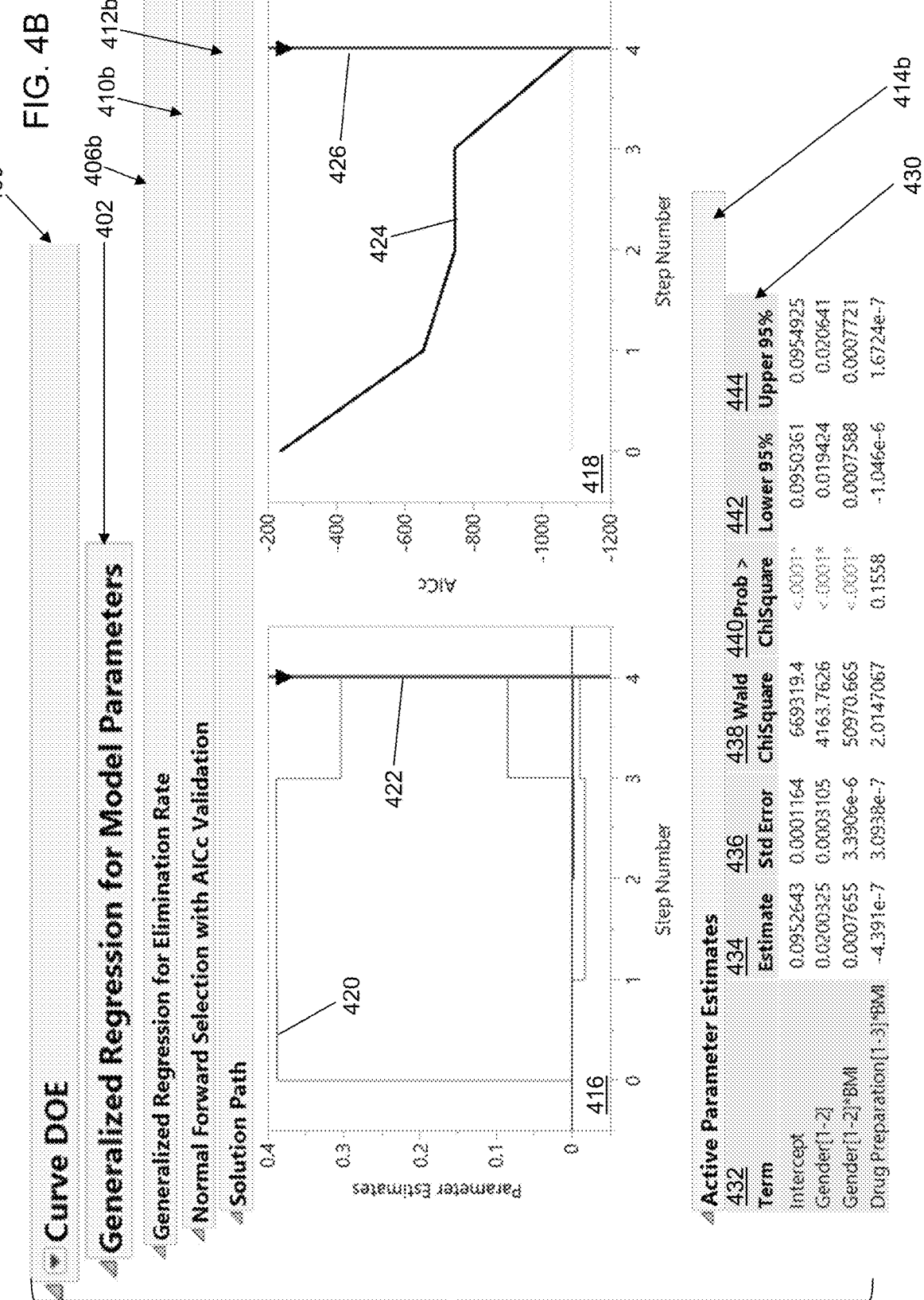
Figure 4C:
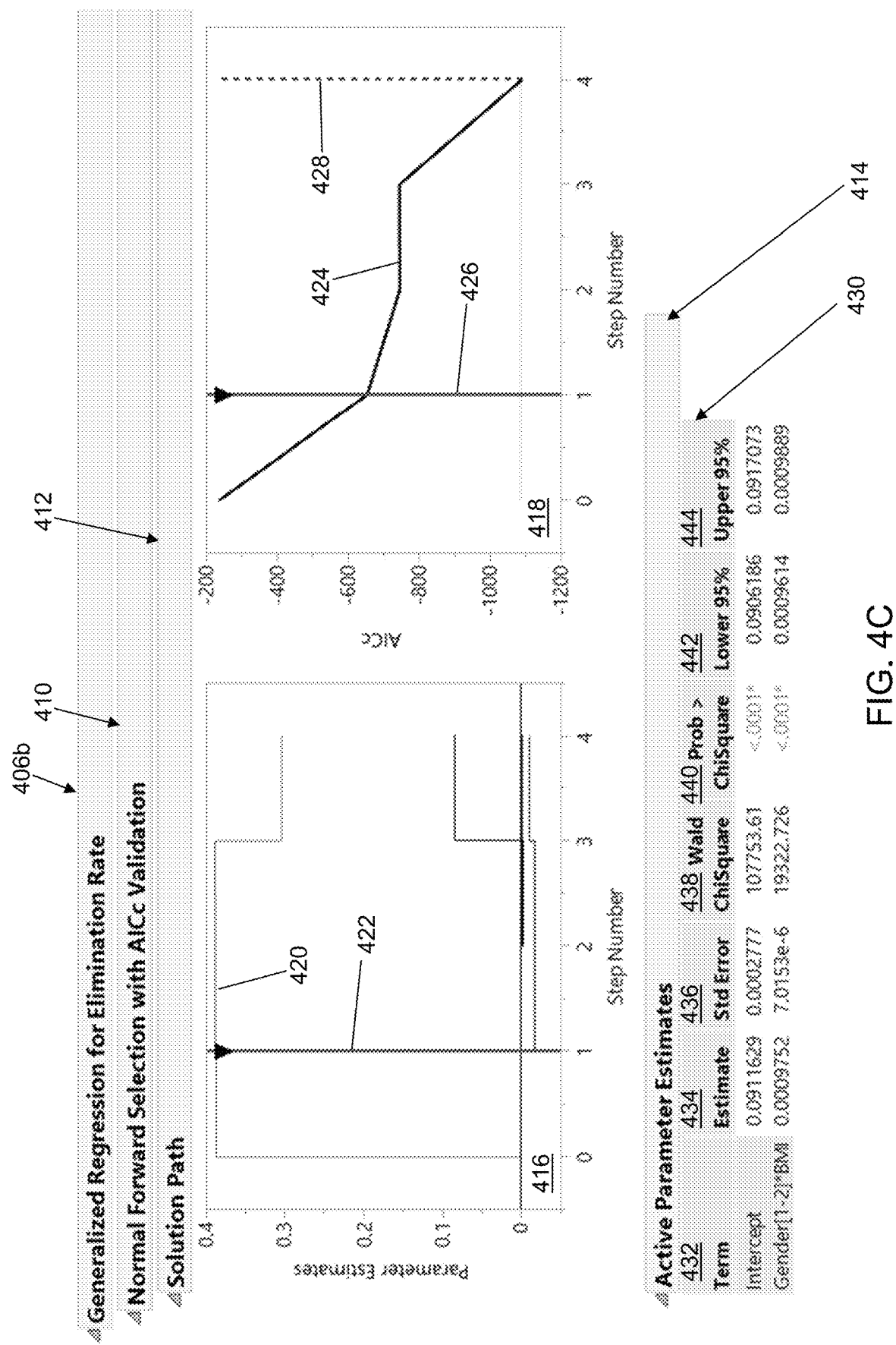

Referring to FIG. 4B, second parameter model sub-window 406b may include a second parameter model fit sub-window 410b that is a child window of linear model sub-window 402. Second parameter model fit sub-window 410b may include a second solution path sub-window 412b and a second active parameter estimate sub-window 414b that presents results for the second parameter, which in the illustrative embodiment is the elimination rate.

Figure 4D:
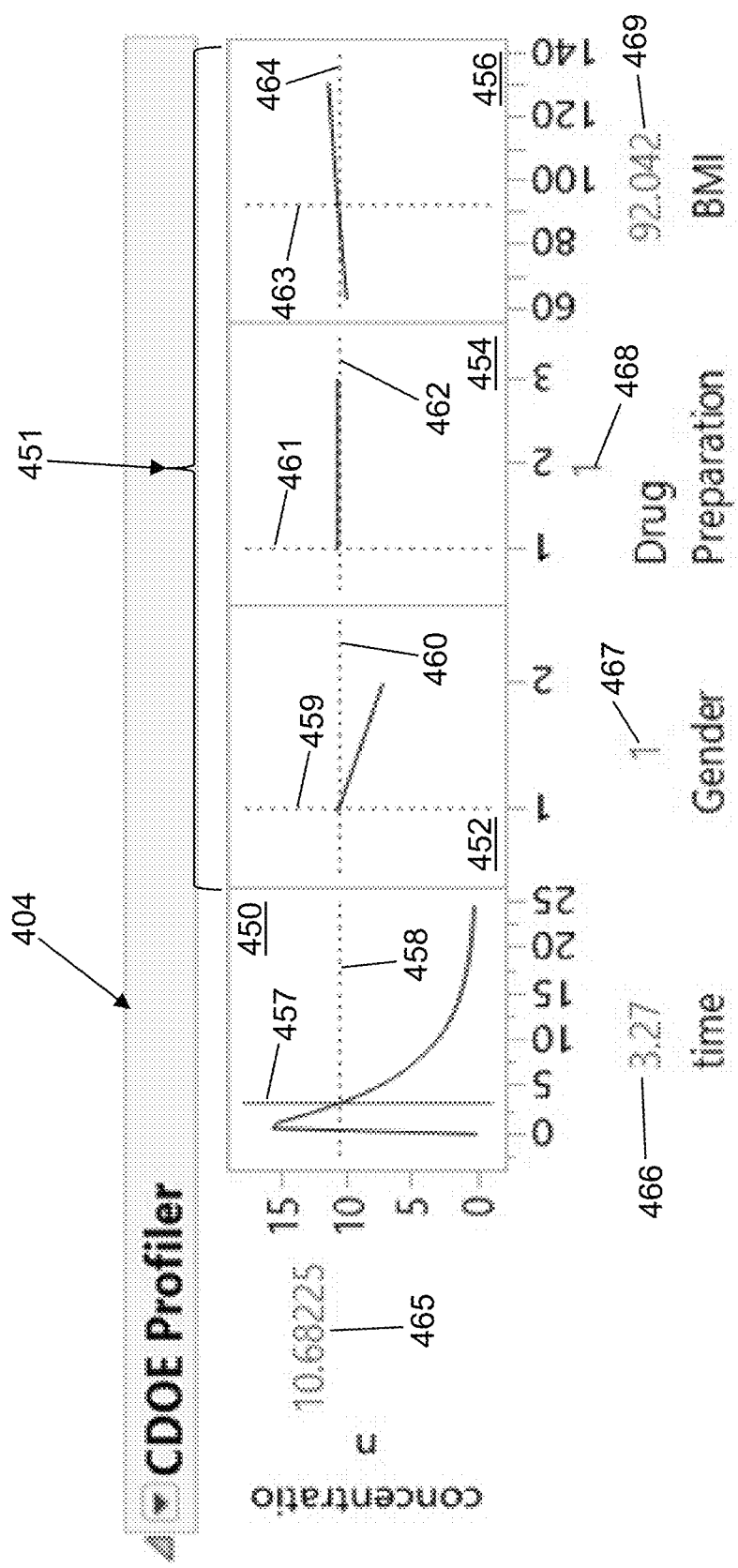
Figure 4E:
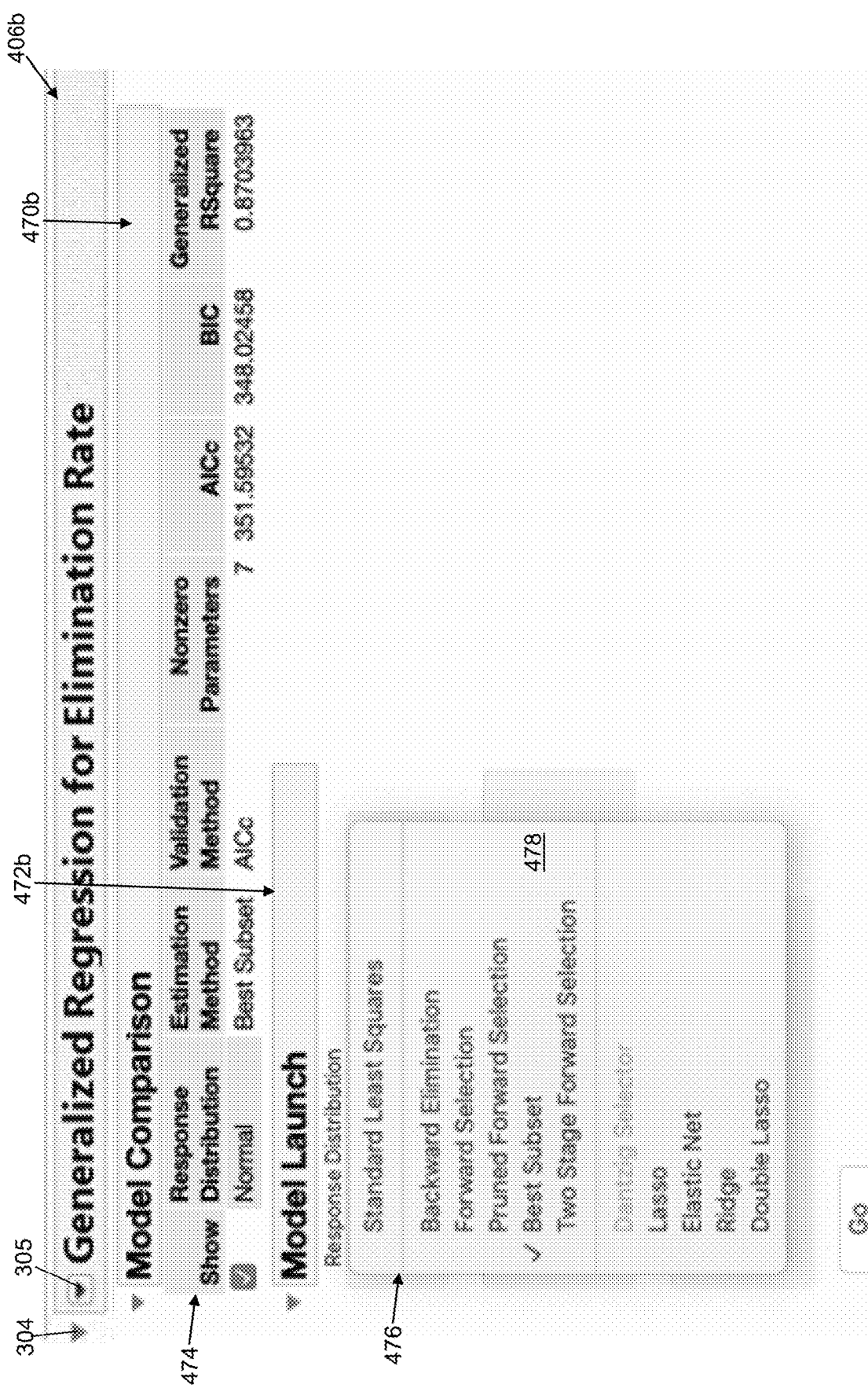
Figure 4F:
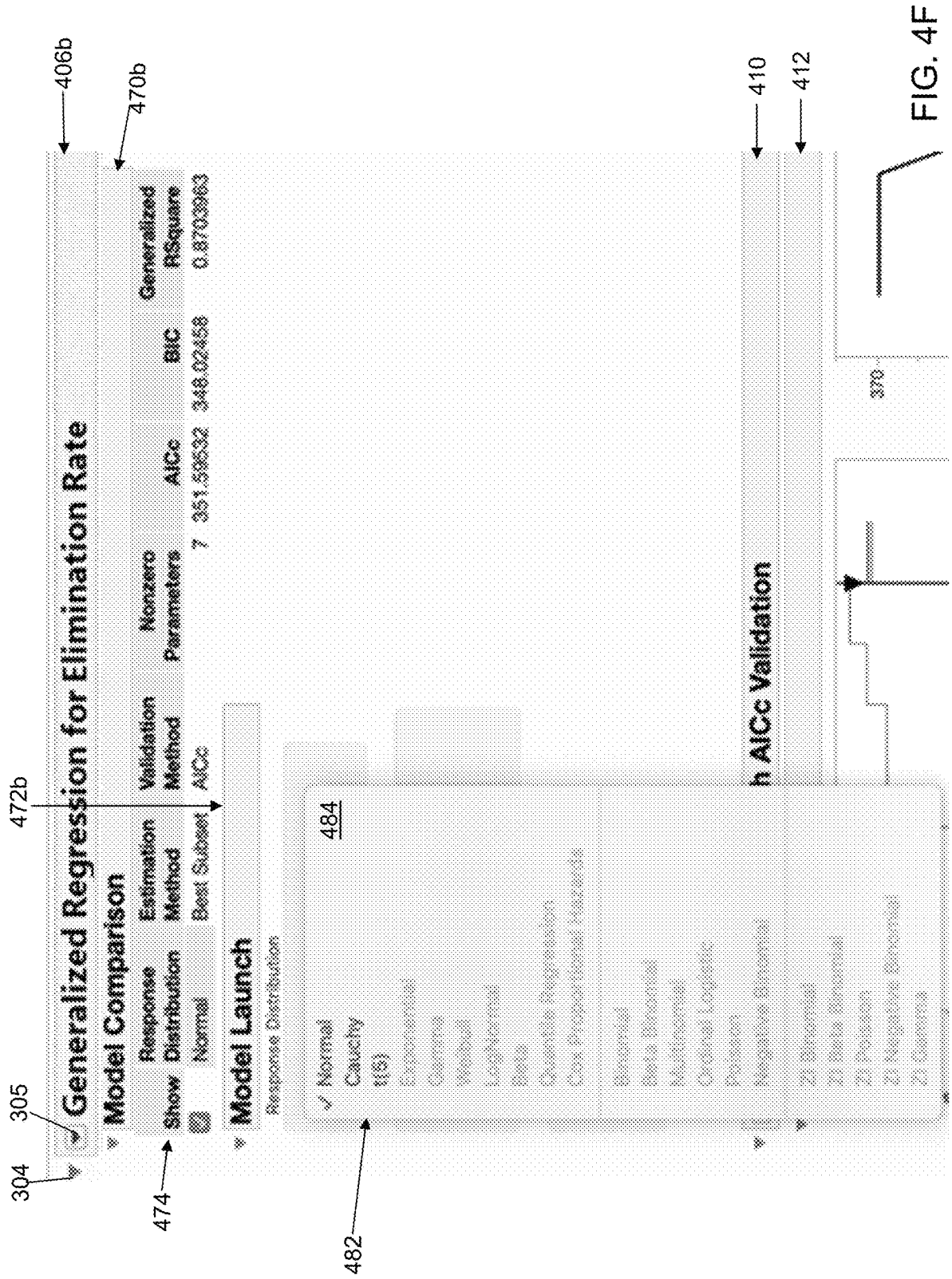
Figure 4G:
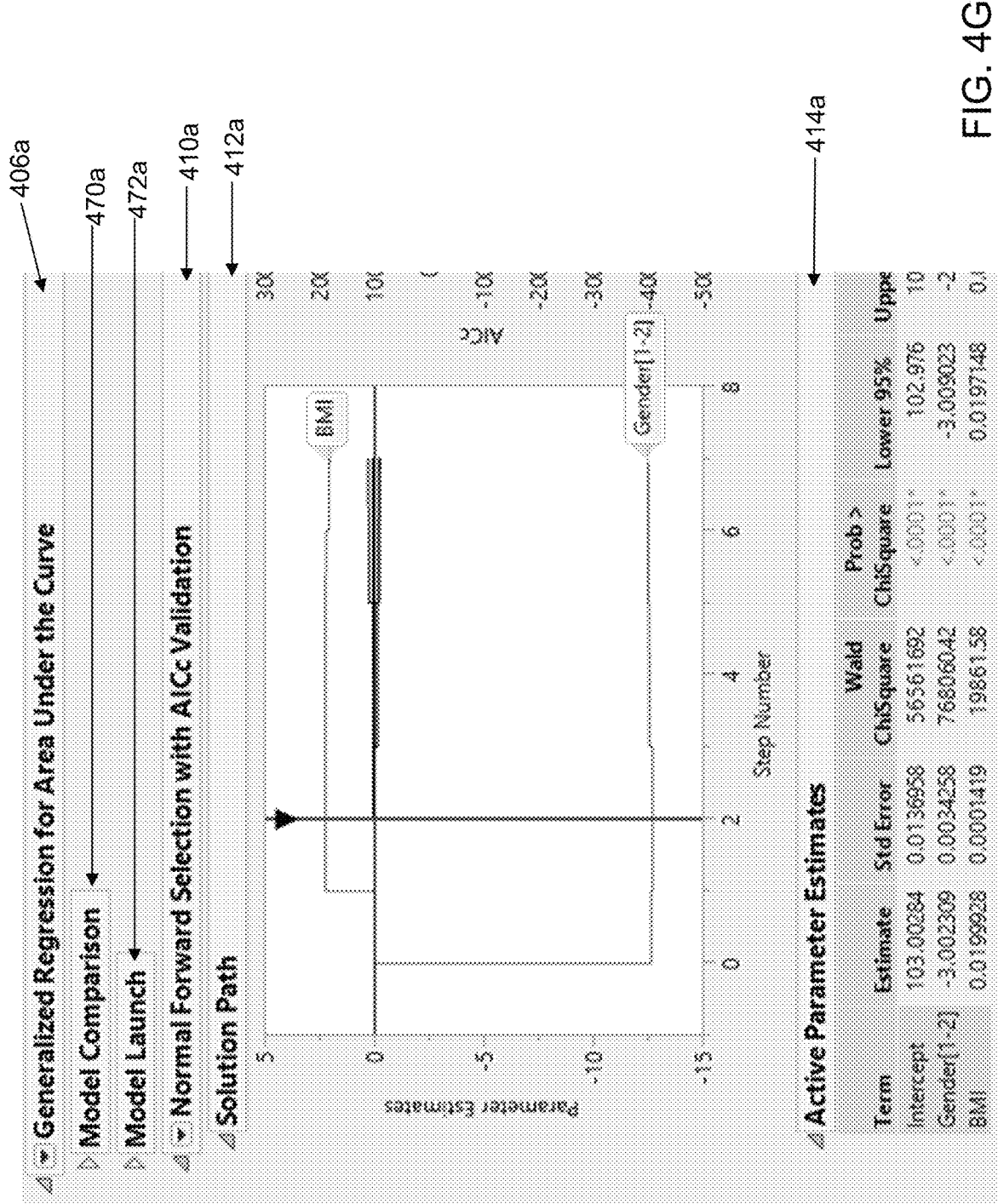

Similarly, referring to FIG. 4G, first parameter model sub-window 406a may include a first parameter model fit sub-window 410a that is a child window of linear model sub-window 402. First parameter model fit sub-window 410a may include a first solution path sub-window 412a and a first active parameter estimate sub-window 414a that presents results for the first parameter, which in the illustrative embodiment is the AUC.

Figure 4H:
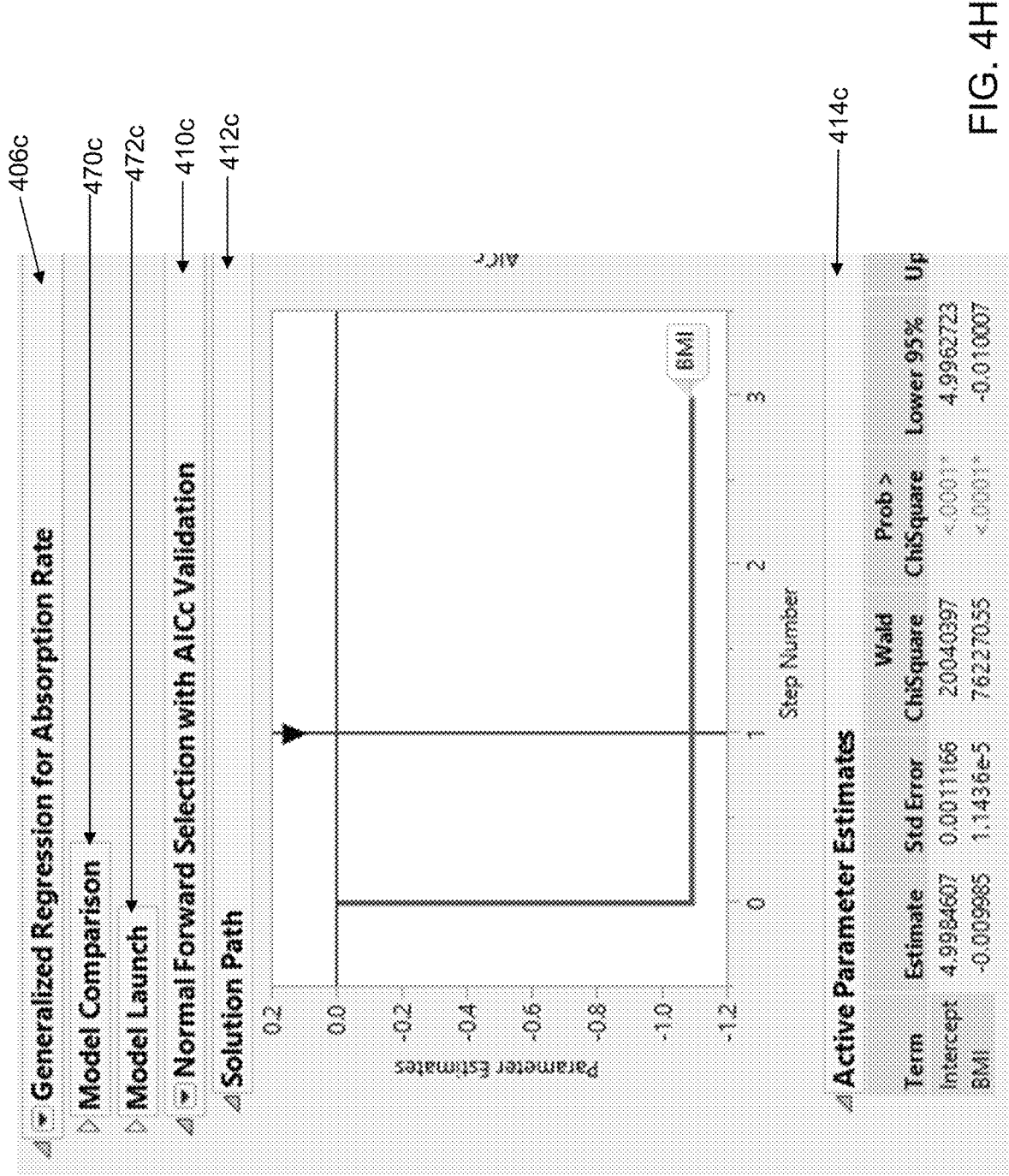

Similarly, referring to FIG. 4H, third parameter model sub-window 406c may include a third parameter model fit sub-window 410c that is a child window of linear model sub-window 402. Third parameter model fit sub-window 410c may include a third solution path sub-window 412c and a third active parameter estimate sub-window 414c that presents results for the third parameter, which in the illustrative embodiment is the absorption rate. As described below, the characteristics used to train the linear model may be modified independently for each parameter of the nonlinear model selected in operation 210. Additionally, the characteristics used to train the nonlinear model may be modified automatically triggering an update to the parameter estimates computed using the retrained nonlinear model as well as retraining the linear model and automatically updating the results presented as part of analysis sub-window 400.

First solution path sub-window 410b may include a parameter estimate graph 416, a validation graph 418, and a reset solution button (not shown) for the second parameter of the nonlinear model. Parameter estimate graph 416 displays values of the estimated parameters for the second parameter. For example, parameter estimate graph 416 presents a curve 420 for the gender parameter used as the only effect. Validation graph 418 displays values of the validation statistic corresponding to the selected validation method for the second parameter. In the illustrative embodiment, AICc is the selected validation method. The horizontal scaling for both graphs is a step number. The forward selection estimation method computes parameter estimates by increasing a number of active effects in the model at each step. In each step, the model is chosen among all possible models with a number of effects given by the step number. Step 0 corresponds to an intercept-only model. Step 1 corresponds to a best model of those that contain a single active effect. The steps continue up to a value of a maximum number of effects that may be defined by the user, for example, using a selector presented in a second parameter launch sub-window 472b (shown referring to FIG. 4E).

Validation graph 418 presents a validation curve 424 that describe how well the trained linear models fit across values of a tuning parameter, or equivalently, across values of a magnitude of scaled parameter estimates. The statistics plotted depend on the selected validation method though smaller values are better. For the k-fold and leave-one-out validation methods, and for a validation column with more than three values, the statistic may be a mean of a scaled negative log-likelihood values across the folds.

A parameter estimate line 422 and a validation line 426 are initially included on both graphs at a value of the step number for a best solution determined based on the validation method. An arrow at a top of parameter estimate line 422 or validation line 426 can be dragged and dropped to a new step number to explore alternative solutions which in turn changes the trained linear model and the information presented in the related sub-windows of second parameter model sub-window 406*b*. For example, the use may want to explore the options that use a fewer number of factors by dragging parameter estimate line 422 or validation line 426 to a lower value. Parameter estimate line 422 and validation line 426 move together regardless of which line is moved.

A user may further click using mouse 114 anywhere in validation graph 418 to change the linear model. For example, referring to FIG. 4C, the user has moved parameter estimate line 422 or validation line 426 from a value of 4 to a value of one. As parameter estimate line 422 or validation line 426 are moved to indicate a new linear model, a dashed vertical line 428 remains to indicate the best fit linear model. Selection of the reset solution button returns parameter estimate line 422 and validation line 426 to the initial best fit solution and, again, the information presented in the related sub-windows is updated accordingly.

Second active parameter estimate sub-window 414*b* is a sibling window relative to second solution path sub-window 412*b*. Second active parameter estimate sub-window 414*b* may include a parameter estimate table 430 for the second parameter where the results are associated with a current location of parameter estimate line 422 and validation line 426. When parameter estimate line 422 and validation line 426 are moved, the results in parameter estimate table 430 are also automatically updated accordingly. Parameter estimate table 430 provides parameter estimates for the linear model for the associated parameter expressed in terms of centered and scaled predictors and determined by the selected validation method.

Parameter estimate table 430 may include a term column 432, an estimate column 434, a standard error column 436, a Wald chi square column 438, a p-value column 440, a lower 95% column 442, and an upper 95% column 444. Term column 432 may include a list of the model terms based on combinations of the one or more factor variables f. Estimate column 434 may include a parameter estimate that corresponds with the associated centered and scaled model term. Standard error column 436 may include an estimate of the standard error that corresponds with the associated centered and scaled model term. Wald chi square column 438 may include a chi square value for a Wald test of whether the parameter is zero that corresponds with the associated centered and scaled model term. P-value column 440 may include a p-value for the Wald test that corresponds with the associated centered and scaled model term. Lower 95% column 442 may include a lower bound for a 95% confidence interval for the associated centered and scaled model term. The confidence level can be changed by the user. Upper 95% column 444 may include an upper bound for a 95% confidence interval for the associated centered and scaled model term.

Selection of an effects line, such as curve 420, shown in parameter estimate graph 416 triggers a highlight of corresponding terms in a row of parameter estimate table 430. Selecting a row in parameter estimate table 430 highlights a corresponding path in parameter estimate graph 416. Multiple paths or rows may be selected.

Referring to FIG. 4D, profiler sub-window 404 may include a prediction graph 450 and one or more factor profile graphs 451. The one or more factor profile graphs 451 include a profile trace for each factor variable of the one or more factor variables f to show how response variable Y varies as a function of each respective factor variable. For example, in the illustrative embodiment, the three factor variables "Gender", "Drug Preparation", and "BMI" were selected using f-variable selector 718. A first factor profile graph 452 shows response variable Y as a function of factor variable "Gender". A second factor profile graph 454 shows response variable Y as a function of factor variable "Drug Preparation". A third factor profile graph 456 shows response variable Y as a function of factor variable "BMI". Profiler sub-window 404 can be used to show how changing one factor at a time effects the predicted values of response variable Y shown in a response curve of prediction graph 450.

Each of prediction graph 450 and the one or more factor profile graphs 451 present a profile based on the trained prediction model, which in the illustrative embodiment is the linear model using an estimation method of forward selection and a validation method of AICc. The curve within each of first factor profile graph 452, second factor profile graph 454, and third factor profile graph 456 show a profile trace for each the three factor variables Gender", "Drug Preparation", and "BMI", respectively. A profile trace is a predicted response as one factor variable is changed while the other factor variables are held constant at their current values. This provides prediction of a shape of a curve for combinations of factor variables that nay not have been observed when input dataset 124 was generated.

The trained prediction model can further be modified using selectors in profiler sub-window 404 adjustment of which results in recomputing the profile traces and predicted responses and an automatic update of the information shown, for example, in prediction graph 450 and in one or more of the factor profile graphs 451. For example, a response vertical line 457 is presented in prediction graph 450. Response vertical line 457 controls the x variable, which is time in the illustrative embodiment. A first factor adjustment line 459 is presented in first factor profile graph 452, a second factor adjustment line 461 is presented in second factor profile graph 454, and a third factor adjustment line 463 is presented in third factor profile graph 456. Response vertical line 457 remains in places as each adjustment line 459, 461, 463 is moved. The curve behind response vertical line 457 is updated as each adjustment line 459, 461, 463 is moved. Each adjustment line 459, 461, 463 is initially presented in association with a best fit model based on model parameters selected for the trained linear model. The user can drag and drop any of first factor adjustment line 459, second factor adjustment line 461, or third factor adjustment line 463 to explore how the linear model results change as the value of individual factors changes. Movement of any of first factor adjustment line 459, second factor adjustment line 461, and third factor adjustment line 463 changes the value of the respective factor. Movement of any of first factor adjustment line 459, second factor adjustment line 461, and third factor adjustment line 463 results in showing a vertical slice across each factor while holding the other factors at their current values. The prediction trace for the factor associated with the moved adjustment line 459, 461, 463 may not be affected, but the prediction trace of the other factors may change.

A response adjustment line 458 is presented in prediction graph 450, a first response adjustment line 460 is presented in first factor profile graph 452, a second response adjustment line 462 is presented in second factor profile graph 454, and a third response adjustment line 464 is presented in third factor profile graph 456. The adjustment lines 458, 460, 462, 464 are vertically aligned with each other and indicate a current predicted value of the response variable Y that crosses an intersection point of the profile traces to define their current value lines. If there are interaction effects or cross-product effects in the trained linear model, the profile trace can shift their slope and curvature as any factor value is changed. If there are no interaction effects, the traces change only in height, not slope or shape. The user may also drag and drop any of response adjustment line 458, first response adjustment line 460, second response adjustment line 462, and third response adjustment line 464 to explore how the factor values change as the current value of the response variable Y changes.

The current value of the response variable Y is shown by a response indicator 465. Response adjustment line 458 graphically shows the current value of the response variable Y. The current value of the explanatory variable X is shown by an explanatory variable indicator 466. Response vertical line 457 graphically shows the current value of the explanatory variable X.

The current value of the first factor $f_1$ is shown by a first factor indicator 467. The current value of the second factor $f_2$ is shown by a second factor indicator 468. The current value of the third factor $f_3$ is shown by a third factor indicator 469. First factor adjustment line 459 graphically shows the current value of the first factor $f_i$. Second factor adjustment line 461 graphically shows the current value of the second factor $f_2$. Third factor adjustment line 463 graphically shows the current value of the third factor $f_3$. For example, referring to FIG. 4G, a patient's AUC rate is adversely impacted by gender and positively impacted by BMI, and referring to FIG. 4H, a patient's absorption rate is adversely impacted by a high BMI, The trained linear model can be modified by the user using other selectors. For example, second parameter model sub-window 406b further may include a second model comparison sub-window 470b and a second parameter model launch sub-window 472b. Similarly, referring to FIG. 4G, first parameter model sub-window 406a further may include a first model comparison sub-window 470a and a first parameter model launch sub-window 472a, and referring to FIG. 4G, third parameter model sub-window 406c further may include a third model comparison sub-window 470c and a third parameter model launch sub-window 472c. For example, first parameter model launch sub-window 472a, second parameter model launch sub-window 472b, and third parameter model launch sub-window 472c may include model sub-windows (not shown) such as a response distribution sub-window, an estimation method sub-window, a validation method sub-window. The validation method sub-window may provide options for selecting methods available for validation of the model fit such as BIC, AICc, k-fold, etc. The user can select one of the sub-windows of first parameter model launch sub-window 472a, second parameter model launch sub-window 472b, and third parameter model launch sub-window 472c to change the model definition independently for each parameter.

For example, referring to FIG. 4E, selection of open/close menu selector 305 of the estimation method sub-window of second parameter launch sub-window 472b may trigger presentation of a model menu 476 that includes a variety of modeling techniques that may be selected to model response variable Y as a function of the functional principal components computed for each value of the group variable g using the one or more factor variables f as predictors or effects. For illustration, three classes of modeling techniques may be used that include maximum likelihood, step-based estimation, and penalized regression. For example, model menu 476 may include standard least squares, backward elimination, forward selection, pruned forward selection, best subset, two-stage forward selection, Dantzig selector, Lasso, elastic net, ridge, double lasso, etc. A check mark next to a best subset selector 478 indicates the best subset estimation method is selected.

For example, referring to FIG. 4F, selection of open/close menu selector 305 of the response distribution method sub-window of second parameter launch sub-window 472b may trigger presentation of a distribution menu 482 that includes a variety of distributions that may be selected for response variable Y including a normal, Cauchy, t(5), exponential, gamma, Weibull, lognormal, beta, quantile regression, Cox proportional hazards models, binomial, beta binomial, multinomial, ordinal logistic, Poisson, negative binomial, zero-inflated binomial, zero-inflated beta binomial, zero-inflated Poisson, zero-inflated negative binomial, zero-inflated gamma, etc. A check mark next to a normal distribution selector 484 indicates the normal distribution function is selected. The non-grayed elements shown in model menu 482 may vary based on the distribution method selected from distribution menu 476.

Based on selections from sub-windows and/or menus associated with analysis sub-window 400, the child windows may change automatically as well as the information presented in each. Illustrative selections are described in Fitting Linear Models, version 15, published by JMP, a business unit of SAS Institute Inc. of Cary, N.C., USA (September 2019).

First model comparison sub-window 470a, second model comparison sub-window 470b, and third model comparison sub-window 470c present information to compare the models that have been fit. Each time a new linear model is defined and fit based on selection of selectors/indicators from analysis sub-window 400 and its sub-windows, a row is added to a model comparison table 474, and the information presented in analysis sub-window 400 and its sub-windows is updated automatically. For example, model comparison table 474 includes a single fit model that used the normal distribution, the best subset estimation method, and a validation method of AICc though other validation methods may be selected as validation methods. For example, BIC, k-fold, leave-one-out, ERIC, holdback, etc. may optionally be selectable as validation methods. Each row of model comparison table 474 can be shown or hidden using a check box in a show column. Other columns in model comparison table 474 contain information about the fit statistics for the associated model.

Referring again to FIG. 2, in an operation 226, a determination is made concerning whether the user has adjusted the linear or nonlinear model, for example, using a selector/indicator from one or more sub-windows of data explorer window 300. For example, the user may change a nonlinear model type using options menu 320, which changes the parameters. When the user has adjusted any of the parameters of the linear or nonlinear model, for example as described above, processing continues in operation 228 to train a new nonlinear or linear model with the new parameters and automatically update the information presented in one or more sub-window of data explorer window 300. When the user has not adjusted the model and indicates that processing is complete, processing continues in an operation 232.

In operation 228, the model value requested for modification is received.

In an operation 230, if the user indicated a modification to the nonlinear model, similar to operation 212, the nonlinear model is trained again with the modified model value, and processing continues in operation 218.

In operation 232, analysis information is written to and stored in linear model description 126, and processing may be stopped. For example, any of the prediction equation, the standard error of the predicted values, the prediction equation in parametric form, the residual values, the standard residual divided by its estimated standard deviation, the first derivative of the prediction function with respect to explanatory variable X, the equation for the standard error of the first derivative, the equation for predicting explanatory variable X from response variable Y, etc. may be written to and stored in linear model description 126.

Model selection application 122 streamlines a two-stage modeling procedure so that only a user selection is required to execute the two-stage modeling procedure rather than writing code and building the linear model themselves. As stated previously, model selection application 122 is easy to use and provides approximately instantaneous feedback so that the user can quickly and efficiently change any of the nonlinear or linear model parameters. Alternative solutions require the user to create, merge, and store data in various tables including for the nonlinear model trained for each value of the grouped variable g and to possibly write code to perform the second stage of the two-stage modeling procedure with the generated data. Additionally, numerous steps are required each time the user wants to modify any of the nonlinear or linear model parameters such that modifying the results is not interactive. To the contrary, model selection application 122 receives a modification to either the nonlinear or linear model parameters or their results and automatically updates the presented results so that the user can interactively explore input dataset 124 in order to build more accurate and understandable models.

Figure 5:
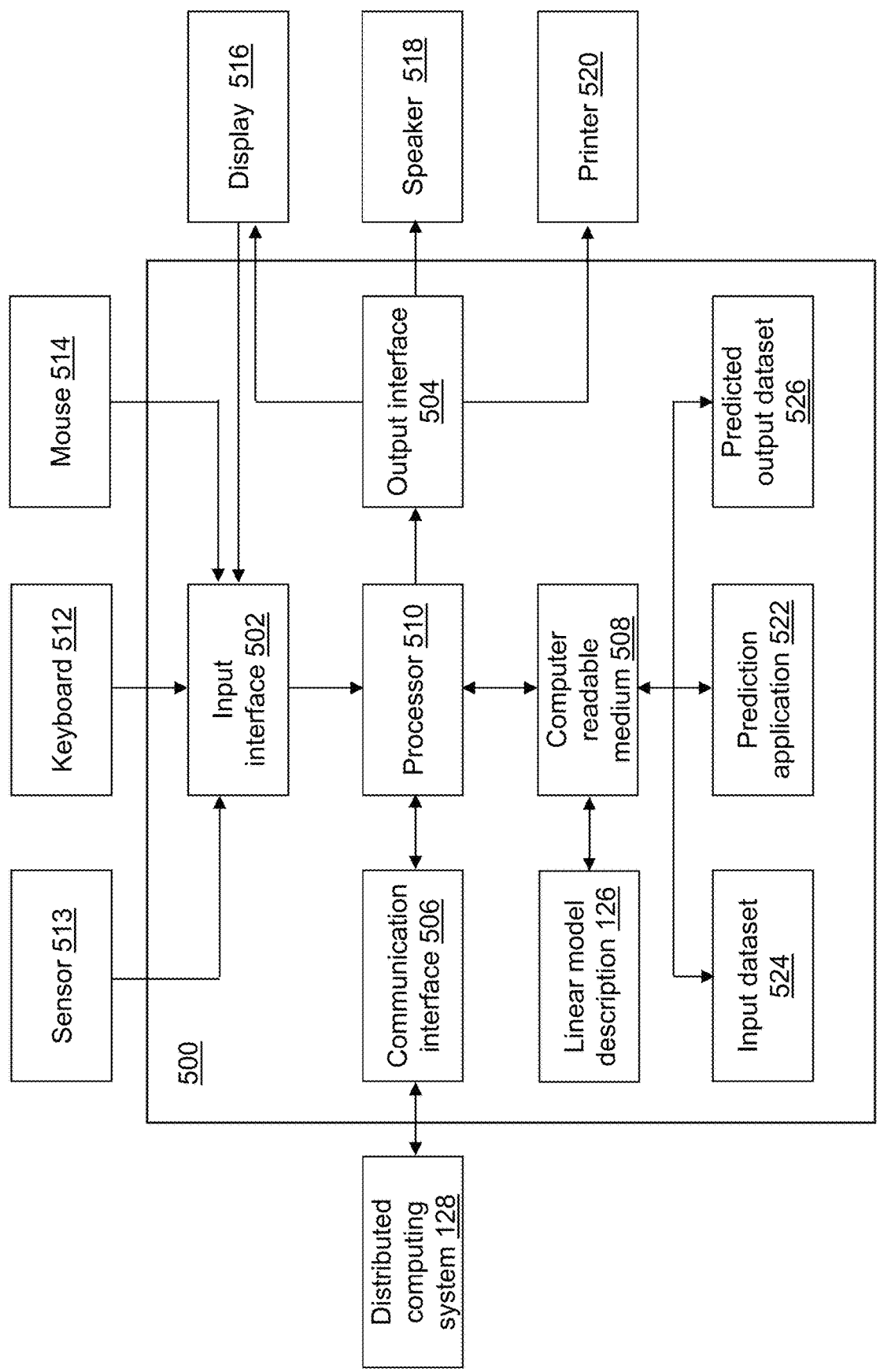
FIG. 5 depicts a block diagram of a prediction device that uses the selected model to predict a result in accordance with an illustrative embodiment.

Referring to FIG. 5, a block diagram of a prediction device 500 is shown in accordance with an illustrative embodiment. Prediction device 500 may include a second input interface 502, a second output interface 504, a second communication interface 506, a second non-transitory computer-readable medium 508, a second processor 510, a prediction application 522, linear model description 126, input dataset 524, and predicted output dataset 526. Fewer, different, and/or additional components may be incorporated into prediction device 500. Prediction device 500 and model selection device 100 may be the same or different devices.

Second input interface 502 provides the same or similar functionality as that described with reference to input interface 102 of model selection device 100 though referring to prediction device 500. Second output interface 504 provides the same or similar functionality as that described with reference to output interface 104 of model selection device 100 though referring to prediction device 500. Second communication interface 506 provides the same or similar functionality as that described with reference to communication interface 106 of model selection device 100 though referring to prediction device 500. Data and messages may be transferred between prediction device 500 and distributed computing system 128 using second communication interface 506. Second computer-readable medium 508 provides the same or similar functionality as that described with reference to computer-readable medium 108 of model selection device 100 though referring to prediction device 500. Second processor 510 provides the same or similar functionality as that described with reference to processor 110 of model selection device 100 though referring to prediction device 500.

Prediction application 522 performs operations associated with predicting values for response variable Y using linear model description 126 based on values for the explanatory variable X stored in input dataset 524. Dependent on the type of data stored in input dataset 124 and input dataset 524, prediction application 522, for example, may provide a prediction of drug toxicity. Some or all of the operations described herein may be embodied in prediction application 522. The operations may be implemented using hardware, firmware, software, or any combination of these methods.

Referring to the example embodiment of FIG. 5, prediction application 522 is implemented in software (comprised of computer-readable and/or computer-executable instructions) stored in second computer-readable medium 508 and accessible by second processor 510 for execution of the instructions that embody the operations of prediction application 522. Prediction application 522 may be written using one or more programming languages, assembly languages, scripting languages, etc. Prediction application 522 may be integrated with other analytic tools. For example, prediction application 522 may be implemented using or integrated with one or more SAS software tools such as JMP®, Base SAS, SAS/STAT®, of SAS® Enterprise Miner™ SAS® SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 522 further may be performed by an ESPE. Prediction application 522 and model selection application 122 further may be integrated applications.

Prediction application 522 may be implemented as a Web application. Prediction application 522 may be integrated with other system processing tools to automatically process data generated as part of operation of an enterprise using second input interface 502, second output interface 504, and/or second communication interface 506 so that appropriate action can be initiated in response. For example, a warning or an alert may be presented using a second display 516, a second speaker 518, a second printer 520, etc. or sent to one or more computer-readable media, display, speaker, printer, etc. of distributed computing system 128 based on predicted values for response variable Y.

input dataset 124 and input dataset 524 may be generated, stored, and accessed using the same or different mechanisms. Similar to input dataset 124, input dataset 524 may include a plurality of rows and a plurality of columns with the plurality of rows referred to as observation vectors or records, and the columns referred to as variables that are associated with an observation. Input dataset 524 may be transposed.

Similar to input dataset 124, input dataset 524 may be stored on second computer-readable medium 508 or on one or more computer-readable media of distributed computing system 128 and accessed by prediction device 500 using second communication interface 506. Data stored in input dataset 524 may be a sensor measurement or a data communication value, for example, from a sensor 513, may be generated or captured in response to occurrence of an event or a transaction, generated by a device such as in response to an interaction by a user with the device, for example, from a second keyboard 512 or a second mouse 514, etc. The data stored in input dataset 524 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 524 may be captured at different time points periodically, intermittently, when an event occurs, etc. One or more columns may include a time value. Similar to input dataset 124, data stored in input dataset 524 may be generated as part of the IoT, and some or all data may be pre- or post-processed by an ESPE.

Similar to input dataset 124, input dataset 524 may be stored in various compressed formats such as a coordinate format, a compressed sparse column format, a compressed sparse row format, etc. Input dataset 524 further may be stored using various structures as known to those skilled in the art including a file system, a relational database, a system of tables, a structured query language database, etc. on model selection device 100, on prediction device 500, and/or on distributed computing system 128. Prediction device 500 and/or distributed computing system 128 may coordinate access to input dataset 524 that is distributed across a plurality of computing devices. For example, input dataset 524 may be stored in a cube distributed across a grid of computers as understood by a person of skill in the art. As another example, input dataset 524 may be stored in a multi-node Hadoop® cluster. As another example, input dataset 524 may be stored in a cloud of computers and accessed using cloud computing technologies, as understood by a person of skill in the art. The SAS LASR™ Analytic Server and/or SAS Viya™ may be used as an analytic platform to enable multiple users to concurrently access data stored in input dataset 524.

Figure 6:
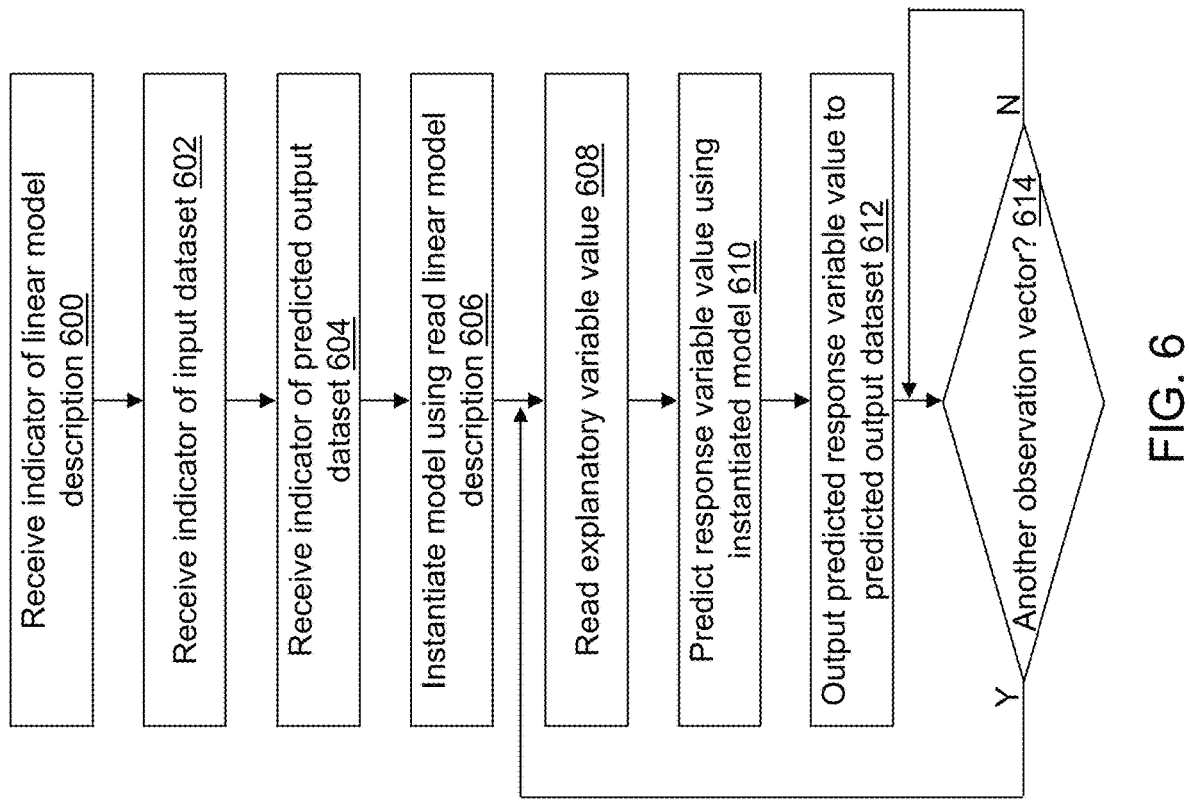
FIG. 6 depicts a flow diagram illustrating examples of operations performed by the prediction device of FIG. 5 in accordance with an illustrative embodiment.

Referring to FIG. 6, example operations of prediction application 522 are described. Additional, fewer, or different operations may be performed depending on the embodiment of prediction application 522. The order of presentation of the operations of FIG. 6 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 600, a ninth indicator may be received that indicates linear model description 126. For example, the ninth indicator indicates a location and a name of linear model description 126. As an example, the ninth indicator may be received by prediction application 522 after selection from a user interface window or after entry by a user into a user interface window. In an alternative embodiment, linear model description 126 may not be selectable. For example, a most recently created linear model description may be used automatically.

In an operation 602, a tenth indicator may be received that indicates input dataset 524. For example, the tenth indicator indicates a location and a name of input dataset 524. As an example, the tenth indicator may be received by prediction application 522 after selection from a user interface window or after entry by a user into a user interface window. In an alternative embodiment, input dataset 524 may not be selectable. For example, a most recently created dataset may be used automatically.

In an operation 604, an eleventh indicator may be received that indicates predicted output dataset 526. For example, the eleventh indicator indicates a location and a name of predicted output dataset 526. As an example, the eleventh indicator may be received by prediction application 522 after selection from a user interface window or after entry by a user into a user interface window. In an alternative embodiment, predicted output dataset 526 may not be selectable. For example, a default name and location for predicted output dataset 526 may be used automatically.

In an operation 606, a linear model is instantiated based on the linear model description read from linear model description 126. For example, a prediction equation may be read and used to instantiate the linear model.

In an operation 608, a value x for the explanatory variable X is read from a next line of input dataset 524 or optionally is received from an ESPE.

In an operation 610, a value y for the response variable Y is predicted using the instantiated linear model and the read value x.

In an operation 612, the predicted value y for the response variable Y is output to predicted output dataset 526. The value x and/or other values read from input dataset 524 further may be output to predicted output dataset 526.

In an operation 614, a determination is made concerning whether there is another observation vector to process. When there is another observation vector to process, processing continues in operation 608. When there is not another observation vector to process, processing continues in operation 614 to wait for receipt of another observation vector, for example, from an ESPE, or processing is done.

Figure 9:
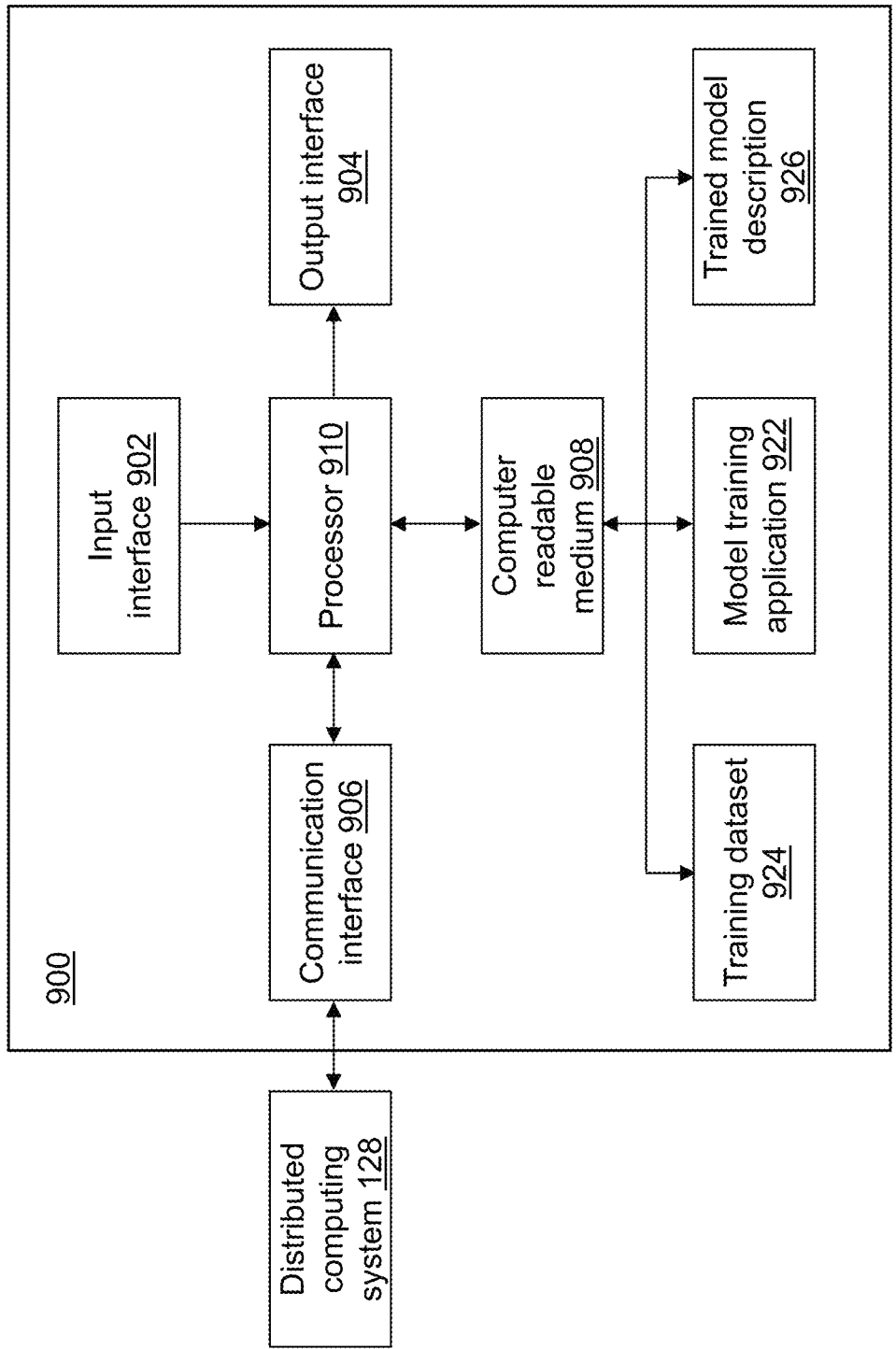
FIG. 9 depicts a block diagram of a model training device that uses variables identified as part of the model selection to train a model and predict a result in accordance with an illustrative embodiment.

Referring to FIG. 9, a block diagram of a model training device 900 is shown in accordance with an illustrative embodiment. Model training device 900 may include a third input interface 902, a third output interface 904, a third communication interface 906, a third non-transitory computer-readable medium 908, a third processor 910, a model training application 922, training dataset 924, and trained model description 926. Training dataset may be input dataset 124 in an illustrative embodiment. Fewer, different, and/or additional components may be incorporated into model training device 900. Model training device 900 and model selection device 100 may be the same or different devices.

Third input interface 902 provides the same or similar functionality as that described with reference to input interface 102 of model selection device 100 though referring to model training device 900. Third output interface 904 provides the same or similar functionality as that described with reference to output interface 104 of model selection device 100 though referring to model training device 900. Third communication interface 906 provides the same or similar functionality as that described with reference to communication interface 106 of model selection device 100 though referring to model training device 900. Data and messages may be transferred between model training device 900 and distributed computing system 128 using third communication interface 906. Third computer-readable medium 908 provides the same or similar functionality as that described with reference to computer-readable medium 108 of model selection device 100 though referring to model training device 900. Third processor 910 provides the same or similar functionality as that described with reference to processor 110 of model selection device 100 though referring to model training device 900.

Model training application 922 performs operations associated with training a model to predict values for response variable Y using the variables identified as relevant to that prediction using model selection application 122. The parameters that describe the trained model may be stored in trained model description 926. Some or all of the operations described herein may be embodied in model training application 922. The operations may be implemented using hardware, firmware, software, or any combination of these methods.

Referring to the example embodiment of FIG. 9, model training application 922 is implemented in software (comprised of computer-readable and/or computer-executable instructions) stored in third computer-readable medium 908 and accessible by third processor 910 for execution of the instructions that embody the operations of model training application 922. Model training application 922 may be written using one or more programming languages, assembly languages, scripting languages, etc. Model training application 922 may be integrated with other analytic tools. For example, model training application 922 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of model training application 922 further may be performed by an ESPE. Model training application 922 and model selection application 122 further may be integrated applications. Model training application 922 may be implemented as a Web application.

input dataset 124 and training dataset 924 may be generated, stored, and accessed using the same or different mechanisms. Similar to input dataset 124, training dataset 924 may include a plurality of rows and a plurality of columns with the plurality of rows referred to as observation vectors or records, and the columns referred to as variables that are associated with an observation. Training dataset 924 may be transposed.

Similar to input dataset 124, training dataset 924 may be stored on second computer-readable medium 908 or on one or more computer-readable media of distributed computing system 128 and accessed by model training device 900 using second communication interface 906. The data stored in training dataset 924 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 924 may be captured at different time points periodically, intermittently, when an event occurs, etc. One or more columns may include a time value. Similar to input dataset 124, data stored in training dataset 924 may be generated as part of the IoT, and some or all data may be pre- or post-processed by an ESPE.

Similar to input dataset 124, training dataset 924 may be stored in various compressed formats such as a coordinate format, a compressed sparse column format, a compressed sparse row format, etc. Training dataset 924 further may be stored using various structures as known to those skilled in the art including a file system, a relational database, a system of tables, a structured query language database, etc. on model selection device 100, on model training device 900, and/or on distributed computing system 128. Model training device 900 and/or distributed computing system 128 may coordinate access to training dataset 924 that is distributed across a plurality of computing devices. For example, training dataset 924 may be stored in a cube distributed across a grid of computers as understood by a person of skill in the art. As another example, training dataset 924 may be stored in a multi-node Hadoop® cluster. As another example, training dataset 924 may be stored in a cloud of computers and accessed using cloud computing technologies, as understood by a person of skill in the art. The SAS LASR™ Analytic Server and/or SAS® Viya™ may be used as an analytic platform to enable multiple users to concurrently access data stored in training dataset 924.

Figure 10:
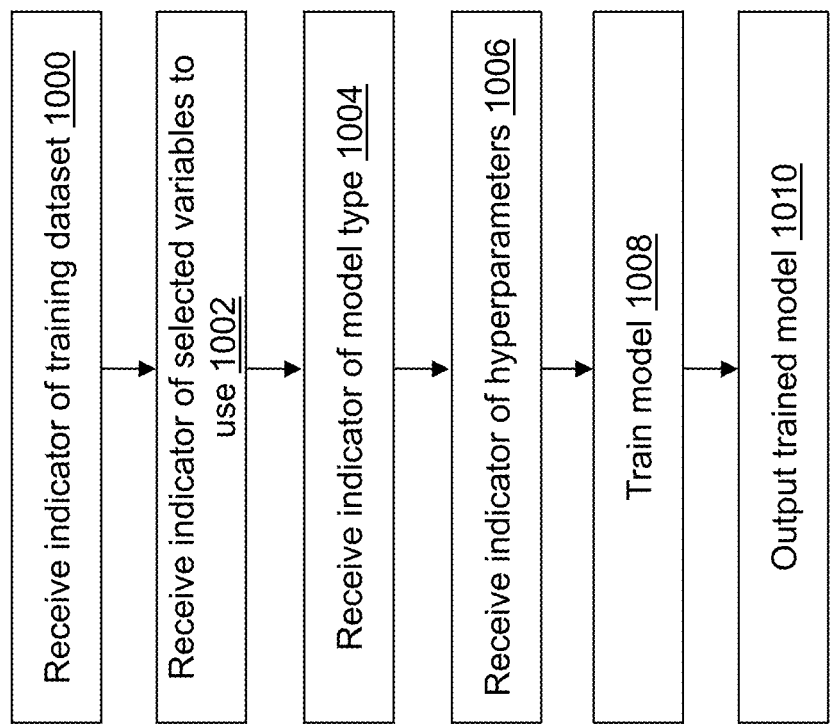
FIG. 10 depicts a flow diagram illustrating examples of operations performed by the model training device of FIG. 9 in accordance with an illustrative embodiment.

Referring to FIG. 10, example operations of model training application 922 are described. Additional, fewer, or different operations may be performed depending on the embodiment of model training application 922. The order of presentation of the operations of FIG. 10 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1000, a twelfth indicator may be received that indicates training dataset 924. For example, the twelfth indicator indicates a location and a name of training dataset 924. As an example, the twelfth indicator may be received by model training application 922 after selection from a user interface window or after entry by a user into a user interface window. In an alternative embodiment, training dataset 924 may not be selectable. For example, a most recently created dataset may be used automatically. Training dataset 924 includes a number of observation vectors N.

In an operation 1002, a thirteenth indicator may be received that indicates a plurality of variables or features to use in training a predictive model using training dataset 924. For example, the thirteenth indicator may indicate a plurality of column numbers or a plurality of column names. As another option, all of the columns may be used by default. Each observation vector $x_i$, i=1, . . . , m read from training dataset 924 may include a value for each variable of the plurality of variables to define m dimensions or features. Training dataset 924 includes a set of observation vectors $X=[x_{j,i}]$, i=1, . . . , m, j=1, . . . , N.

In an operation 1004, a fourteenth indicator indicates a model type. For example, the fourteenth indicator indicates a name of a model type that performs prediction and/or classification. The fourteenth indicator may be received by model training application 922 from a user interface window or after entry by a user into a user interface window. A default value for the model type may further be stored, for example, in third computer-readable medium 908. As an example, a model type may be selected from "SVM", "K-Cluster", "Neural Network", "Logistic Regression", "Forest", "Gradient Boosting", "Decision Tree", "Factorization Machine", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type.

For example, a default model type may be indicated by "Gradient Boosting". Of course, the model type may be labeled or selected in a variety of different manners by the user as understood by a person of skill in the art. In an alternative embodiment, the model type may not be selectable, and a single model type is implemented by model training application 922. For example, the model type indicated as "Gradient Boosting" may be used by default or without allowing a selection.

In an operation 1006, a fifteenth indicator of one or more hyperparameters to use for training and validating the indicated model type and/or specified values for an automatic tuning method (autotune option) are received. Hyperparameters define values or various options that govern a training process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user.

In an operation 1008, a model is trained using the values of the selected variables indicated in operation 1002 for each observation vector read from training dataset 924 indicated in operation 1000 based on the model type indicated in operation 1004, and the hyperparameters indicated in operation 1006. For example, the model may be trained and validated using another application that is distinct from model training application 922 or is integrated with model training application 922. Model training application 922 performs operations associated with defining trained model description 926. For illustration, a TREESPLIT Procedure included in SAS® Visual Data Mining and Machine Learning 8.1: Statistical Procedures developed and provided by SAS Institute Inc. of Cary, N.C., USA may be used for a decision tree model type; a FACTMAC procedure included in SAS® Visual Data Mining and Machine Learning 8.1: Data Mining and Machine Learning Procedures developed and provided by SAS Institute Inc. of Cary, N.C., USA may be used for a factorization machine model type; a FOREST procedure included in SAS® Visual Data Mining and Machine Learning 8.1: Data Mining and Machine Learning Procedures developed and provided by SAS Institute Inc. of Cary, N.C., USA may be used for a random forest model type; a GRADBOOST procedure included in SAS® Visual Data Mining and Machine Learning 8.1: Data Mining and Machine Learning Procedures developed and provided by SAS Institute Inc. of Cary, N.C., USA may be used for a gradient boosting model type; a NNET procedure included in SAS® Visual Data Mining and Machine Learning 8.1: Data Mining and Machine Learning Procedures developed and provided by SAS Institute Inc. of Cary, N.C., USA may be used for a gradient boosting model type; a SVMACHINE procedure included in SAS® Visual Data Mining and Machine Learning 8.1: Data Mining and Machine Learning Procedures developed and provided by SAS Institute Inc. of Cary, N.C., USA may be used for a support vector machine model type; a HPLOGISTIC procedure included in SAS/STAT®15.1 developed and provided by SAS Institute Inc. of Cary, N.C., USA may be used for a logistic regression model type; a KCLUS procedure included in SAS® Visual Data Mining and Machine Learning 8.1: Statistical Procedures developed and provided by SAS Institute Inc. of Cary, N.C., USA may be used for a k-means clustering model type; etc.

In an operation 1010, the data that describes the trained model is stored in trained model description 926. For illustration, the trained model may be stored using the ASTORE procedure provided by SAS® Visual Data Mining and Machine Learning software. The trained model can then be used by prediction application 922 to predict a response variable value though by instantiating the trained model using trained model description 926 instead of linear model description 126.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   read a dataset that includes a plurality of observation vectors, wherein a unique subset of the plurality of observation vectors is defined for each unique value of a plurality of values of a group variable,
      wherein each observation vector of the plurality of observation vectors includes an explanatory variable value of an explanatory variable, a response variable value of a response variable, a group variable value of the group variable, and a factor variable value of a factor variable,
      wherein the group variable defines a group associated with a respective unique subset of observation vectors, wherein the factor variable defines a characteristic of each respective group;
   (A) train a nonlinear model of a nonlinear model type with each unique subset of the plurality of observation vectors to describe the response variable based on the explanatory variable for each unique value of the plurality of values of the group variable, wherein each trained nonlinear model defines a parameter estimate value for a parameter variable of the nonlinear model type;
   (B) present nonlinear model results from the trained nonlinear model defined for each unique value of the plurality of values of the group variable within a first sub-window of a first window of a display;
   (C) receive an indicator of a request to perform parameter analysis of the nonlinear model results using the factor variable, wherein the indicator is received in association with the first window of the display when a selector presented in the first window is selected;
   (D) train a linear model of the parameter variable of the nonlinear model using the parameter estimate value from each trained nonlinear model with the factor variable value of each unique subset of the plurality of observation vectors as a model effect;

(E) present linear model results from the trained linear model of the parameter variable of the nonlinear model within a second sub-window of the first window of the display; and (F) present predicted response variable values as a function of the explanatory variable and as a function of the factor variable using the linear model results combined with the nonlinear model results within a third sub-window of the first window of the display, wherein the first window provides an interactive graphical interface to present an effect of the factor variable on the predicted response variable values.

2. The non-transitory computer-readable medium of claim 1, wherein a second selector associated with the first window of the display provides user selection of the nonlinear model type to train in (A).

3. The non-transitory computer-readable medium of claim 2, wherein the nonlinear model type is selected from a group consisting of a sigmoid curve model type, an exponential growth and decay model type, a peak model type, a pharmacokinetic model type, and a fit Michaelis Menten model type.

4. The non-transitory computer-readable medium of claim 1, wherein a second selector associated with the first window of the display provides user selection of a type of linear model to train in (D).

5. The non-transitory computer-readable medium of claim 4, wherein the type of linear model to train in (D) is a generalized linear model.

6. The non-transitory computer-readable medium of claim 4, wherein the type of linear model to train in (D) is a generalized linear model and a third selector associated with the first window of the display provides user selection of a response distribution method used by the generalized linear model.

7. The non-transitory computer-readable medium of claim 4, wherein the type of linear model to train in (D) is a generalized linear model and a third selector associated with the first window of the display provides user selection of an estimation method used by the generalized linear model.

8. The non-transitory computer-readable medium of claim 4, wherein the type of linear model to train in (D) is a generalized linear model and a third selector associated with the first window of the display provides user selection of a validation method used by the generalized linear model.

9. The non-transitory computer-readable medium of claim 1, wherein, after (F), a second selector associated with the first window of the display provides user modification of the trained nonlinear model, wherein (A) through (F) is automatically repeated when the second selector indicates the user modification of the trained nonlinear model.

10. The non-transitory computer-readable medium of claim 1, wherein, after (F), a second selector associated with the first window of the display provides user modification of a type of linear model to train in (D), wherein (D) through (F) is automatically repeated when the second selector indicates the user modification of the type of model to train.

11. The non-transitory computer-readable medium of claim 1, wherein a type of linear model to train in (D) is a generalized linear model, wherein, after (F), a second selector associated with the first window of the display provides user modification of a response distribution method used by the generalized linear model, wherein (D) through (F) is automatically repeated when the second selector indicates the user modification of the response distribution method.

12. The non-transitory computer-readable medium of claim 1, wherein a type of linear model to train in (D) is a generalized linear model, wherein, after (F), a second selector associated with the first window of the display provides user modification of an estimation distribution method used by the generalized linear model, wherein (D) through (F) is automatically repeated when the second selector indicates the user modification of the estimation distribution method.

13. The non-transitory computer-readable medium of claim 1, wherein a type of linear model to train in (D) is a generalized linear model, wherein, after (F), a second selector associated with the first window of the display provides user modification of a validation method used by the generalized linear model, wherein (D) through (F) is automatically repeated when the second selector indicates the user modification of the validation method.

14. The non-transitory computer-readable medium of claim 1, wherein, after (F), a second selector associated with the first window of the display provides user modification of a current factor variable value, wherein (D) through (F) is automatically repeated when the second selector indicates the user modification of the current factor variable value.

15. The non-transitory computer-readable medium of claim 1, wherein, after (F), a second selector associated with the first window of the display provides user modification of a selected number of active effects value, wherein (D) through (F) is automatically repeated when the second selector indicates the user modification of the selected number of active effects value.

16. The non-transitory computer-readable medium of claim 1, wherein each observation vector of each plurality of observation vectors further includes the factor variable value for each of a plurality of factor variables, wherein the factor variable is one of the plurality of factor variables.

17. The non-transitory computer-readable medium of claim 16, wherein, after (F), a second selector associated with the first window of the display provides user modification of a current factor variable value for one of the plurality of factor variables, wherein (D) through (F) is automatically repeated when the second selector indicates the user modification of the current factor variable value.

18. The non-transitory computer-readable medium of claim 17, wherein, after (D) through (F) is automatically repeated with the user modification of the current factor variable value, the computer-readable instructions further cause the computing device to output an indicator of the factor variable selected from the plurality of factor variables to model the explanatory variable value.

19. The non-transitory computer-readable medium of claim 16, wherein the computer-readable instructions further cause the computing device to:
  train a model using observation vector values associated with the explanatory variable, the response variable, and the factor variable selected from the plurality of factor variables;
  read a second explanatory variable value from a scoring dataset;
  compute a new response variable value using the trained model; and
  output the computed new response variable value.

20. The non-transitory computer-readable medium of claim 1, wherein the computer-readable instructions further cause the computing device to:
  read a second explanatory variable value from a scoring dataset;

compute a new response variable value using parameters that describe the trained nonlinear model with the read, second explanatory variable value; and output the computed new response variable value.

21. A computing device comprising:
a processor; and
a non-transitory computer-readable medium operably coupled to the processor, the computer-readable medium having computer-readable instructions stored thereon that, when executed by the processor, cause the computing device to
read a dataset that includes a plurality of observation vectors, wherein a unique subset of the plurality of observation vectors is defined for each unique value of a plurality of values of a group variable,
wherein each observation vector of the plurality of observation vectors includes an explanatory variable value of an explanatory variable, a response variable value of a response variable, a group variable value of the group variable, and a factor variable value of a factor variable,
wherein the group variable defines a group associated with a respective unique subset of observation vectors, wherein the factor variable defines a characteristic of each respective group;
(A) train a nonlinear model of a nonlinear model type with each unique subset of the plurality of observation vectors to describe the response variable based on the explanatory variable for each unique value of the plurality of values of the group variable, wherein each trained nonlinear model defines a parameter estimate value for a parameter variable of the nonlinear model type;
(B) present nonlinear model results from the trained nonlinear model defined for each unique value of the plurality of values of the group variable within a first sub-window of a first window of a display;
(C) receive an indicator of a request to perform parameter analysis of the nonlinear model results using the factor variable, wherein the indicator is received in association with the first window of the display when a selector presented in the first window is selected;
(D) train a linear model of the parameter variable of the nonlinear model using the parameter estimate value from each trained nonlinear model with the factor variable value of each unique subset of the plurality of observation vectors as a model effect;
(E) present linear model results from the trained linear model of the parameter variable of the nonlinear model within a second sub-window of the first window of the display; and
(F) present predicted response variable values as a function of the explanatory variable and as a function of the factor variable using the linear model results combined with the nonlinear model results within a third sub-window of the first window of the display, wherein the first window provides an interactive graphical interface to present an effect of the factor variable on the predicted response variable values.

22. A method of providing interactive model selection, the method comprising:
reading, by a computing device, a dataset that includes a plurality of observation vectors defined for each value of a plurality of values of a group variable, wherein a unique subset of the plurality of observation vectors is defined for each unique value of a plurality of values of a group variable,
wherein each observation vector of the plurality of observation vectors includes an explanatory variable value of an explanatory variable, a response variable value of a response variable, a group variable value of the group variable, and a factor variable value of a factor variable,
wherein the group variable defines a group associated with a respective unique subset of observation vectors, wherein the factor variable defines a characteristic of each respective group;
(A) training, by the computing device, a nonlinear model of a nonlinear model type with each unique subset of the plurality of observation vectors to describe the response variable based on the explanatory variable for each unique value of the plurality of values of the group variable, wherein each trained nonlinear model defines a parameter estimate value for a parameter variable of the nonlinear model type;
(B) presenting, by the computing device, nonlinear model results from the trained nonlinear model defined for each unique value of the plurality of values of the group variable within a first sub-window of a first window of a display;
(C) receiving, by the computing device, an indicator of a request to perform parameter analysis of the nonlinear model results using the factor variable, wherein the indicator is received in association with the first window of the display when a selector presented in the first window is selected;
(D) training, by the computing device, a linear model of the parameter variable of the nonlinear model using the parameter estimate value from each trained nonlinear model with the factor variable value of each unique subset of the plurality of observation vectors as a model effect;
(E) presenting, by the computing device, linear model results from the trained linear model of the parameter variable of the nonlinear model within a second sub-window of the first window of the display; and
(F) presenting, by the computing device, predicted response variable values as a function of the explanatory variable and as a function of the factor variable using the linear model results combined with the nonlinear model results within a third sub-window of the first window of the display, wherein the first window provides an interactive graphical interface to present an effect of the factor variable on the predicted response variable values.

23. The method of claim 22, wherein a second selector associated with the first window of the display provides user selection of the nonlinear model type to train in (A).

24. The method of claim 23, wherein the nonlinear model type is selected from a group consisting of a sigmoid curve model type, an exponential growth and decay model type, a peak model type, a pharmacokinetic model type, and a fit Michaelis Menten model type.

25. The method of claim 22, wherein a second selector associated with the first window of the display provides user selection of a type of linear model to train in (D).

26. The method of claim 25, wherein the type of linear model to train in (D) is a generalized linear model.

27. The method of claim 25, wherein the type of linear model to train in (D) is a generalized linear model and a third selector associated with the first window of the display provides user selection of a response distribution method used by the generalized linear model.

28. The method of claim 25, wherein the type of linear model to train in (D) is a generalized linear model and a third selector associated with the first window of the display provides user selection of an estimation method used by the generalized linear model.

29. The method of claim 25, wherein the type of linear model to train in (D) is a generalized linear model and a third selector associated with the first window of the display provides user selection of a validation method used by the generalized linear model.

30. The method of claim 22, wherein, after (F), a second selector associated with the first window of the display provides user modification of the trained nonlinear model, wherein (A) through (F) is automatically repeated when the second selector indicates the user modification of the trained nonlinear model.

\* \* \* \* \*

UNITED STATES PATENT AND TRADEMARK OFFICE
CERTIFICATE OF CORRECTION

PATENT NO. : 10,970,651 B1
APPLICATION NO. : 16/904698
DATED : April 6, 2021
INVENTOR(S) : Clayton Adam Barker et al.

Page 1 of 1

It is certified that error appears in the above-identified patent and that said Letters Patent is hereby corrected as shown below:

In the Specification

Column 7, Line 53:
Delete the phrase "a multi-node Hadoop cluster." and replace with --a multi-node Hadoop® cluster.--.

Column 7, Line 59:
Delete the phrase "SAS LASR™" and replace with --SAS® LASR™--.

Column 7, Lines 61-62:
Delete the phrase "SAS Viya™" and replace with --SAS® Viya™--.

Column 19, Line 26:
Delete the phrase "first factor $f_i$." and replace with --first factor $f_1$.--.

Column 23, Lines 33-34:
Delete the phrase "The SAS LASR™ Analytic Server and/or SAS Viya™" and replace with --The SAS® LASR™ Analytic Server and/or SAS® Viya™--.

Column 26, Lines 9-10:
Delete the phrase "The SAS LASR™ Analytic Server and/or SAS Viya™" and replace with --The SAS® LASR™ Analytic Server and/or SAS® Viya™--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*